(12) United States Patent
Zerbe et al.

(10) Patent No.: US 7,308,044 B2
(45) Date of Patent: Dec. 11, 2007

(54) TECHNIQUE FOR RECEIVING DIFFERENTIAL MULTI-PAM SIGNALS

(75) Inventors: Jared LeVan Zerbe, Woodside, CA (US); Grace Tsang, Los Altos, CA (US); Mark Horowitz, Menlo Park, CA (US); Bruno Werner Garlepp, San Jose, CA (US); Carl William Werner, Los Gatos, CA (US)

(73) Assignee: Rambus Inc, Los Altos, CA (US)

( * ) Notice: Subject to any disclaimer, the term of this patent is extended or adjusted under 35 U.S.C. 154(b) by 783 days.

(21) Appl. No.: 10/673,677

(22) Filed: Sep. 30, 2003

(65) Prior Publication Data

US 2005/0069067 A1 Mar. 31, 2005

(51) Int. Cl.
*H04L 27/06* (2006.01)

(52) U.S. Cl. .............. 375/316; 375/353; 375/286; 375/268; 375/136; 327/336; 327/333; 327/52; 327/62

(58) Field of Classification Search .......... 375/136, 375/316, 353; 327/336, 319, 333, 51, 52, 327/55, 57, 65, 69, 70, 344, 208
See application file for complete search history.

(56) References Cited

U.S. PATENT DOCUMENTS

| | | | | |
|---|---|---|---|---|
| 6,396,329 | B1 * | 5/2002 | Zerbe | 327/336 |
| 6,462,623 | B1 * | 10/2002 | Horan et al. | 331/17 |
| 6,614,371 | B2 * | 9/2003 | Zhang | 341/101 |
| 6,825,696 | B2 * | 11/2004 | Jaussi et al. | 327/55 |
| 2002/0091948 | A1 * | 7/2002 | Werner et al. | 703/300 |
| 2003/0194016 | A1 * | 10/2003 | Gorecki et al. | 375/268 |
| 2004/0119627 | A1 * | 6/2004 | Jaussi et al. | 341/155 |

OTHER PUBLICATIONS

M. Rau et al., "Clock/Data Recovery PLL Using Half-Frequency Clock," IEEE Journal Of Solid-State Circuits, vol. 32, No. 7, July 1997, pp. 1156-1159.

Chih-Kong et al., "A 0.8-μm CMOS 2.5 Gb/s Oversampling Receiver and Transmitter for Serial Link," IEEE Journal Of Solid-State Circuits, vol. 31, No. 12 Dec. 1996, pp. 2015-2023.

(Continued)

*Primary Examiner*—Chieh M. Fan
*Assistant Examiner*—Siu M Lee
(74) *Attorney, Agent, or Firm*—Hunton & Williams LLP

(57) ABSTRACT

A technique for receiving differential multi-PAM signals is disclosed. In one particular exemplary embodiment, the technique may be realized as a differential multi-PAM extractor circuit. In this particular exemplary embodiment, the differential multi-PAM extractor circuit comprises an upper LSB sampler circuit configured to receive a differential multi-PAM input signal and a first differential reference signal, and to generate a first differential sampled output signal. The differential multi-PAM extractor circuit also comprises a lower LSB sampler circuit configured to receive the differential multi-PAM input signal and a second differential reference signal, and to generate a second differential sampled output signal. The differential multi-PAM extractor circuit further comprises a combiner circuit configured to receive the first differential sampled output signal and the second differential sampled output signal, and to generate a differential LSB output signal indicating an LSB value of the differential multi-PAM input signal.

52 Claims, 30 Drawing Sheets

OTHER PUBLICATIONS

Ramin Farjad-Rad et al., "A 0.3-μm CMOS 8-Gb/s 4-PAM Serial Link Transceiver," IEEE Journal Of Solid-State Circuits, vol. 35, No. 5, May 2000, pp. 757-764.

Kun-Yung Ken Chang et al., "A 0.4-4Gb/s CMOS Quad Transceiver Cell using On-chip Regulated Dual-Loop PLLs," 4 pages, 2002.

* cited by examiner

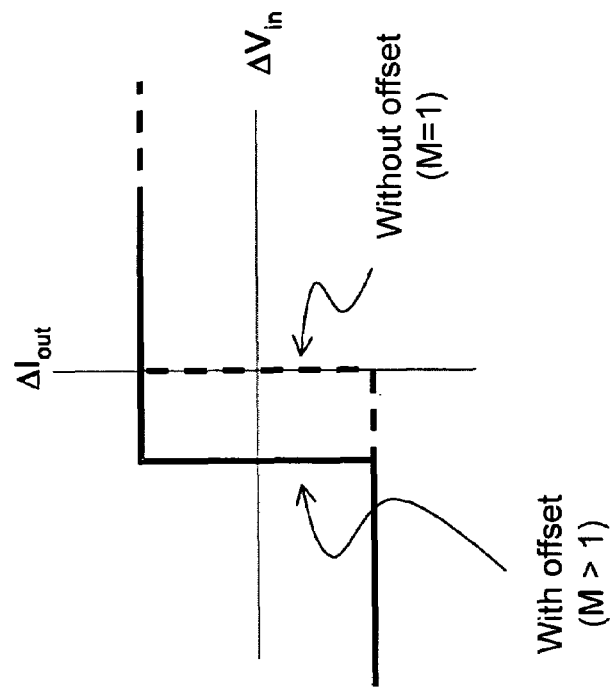
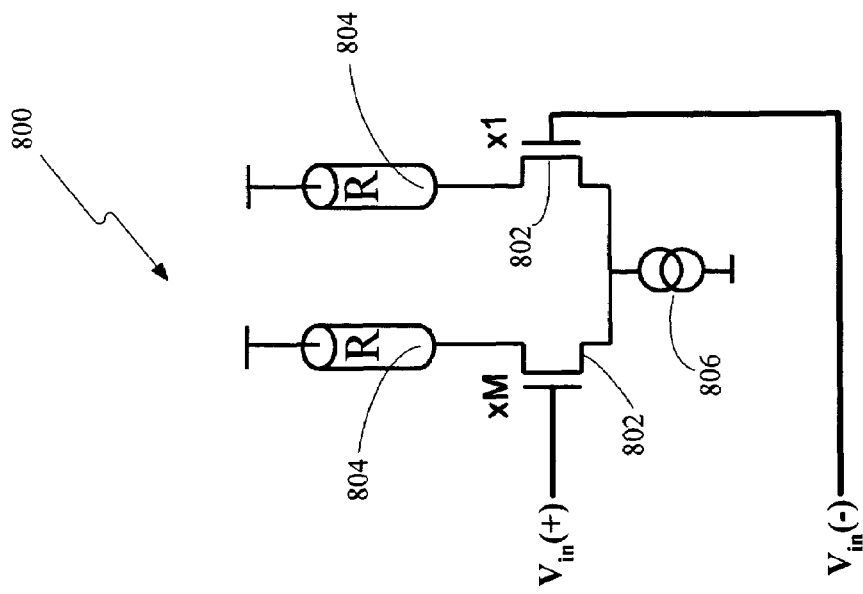
Figure 8A
Figure 8B

US 7,308,044 B2

TECHNIQUE FOR RECEIVING DIFFERENTIAL MULTI-PAM SIGNALS

FIELD OF THE INVENTION

The present invention relates generally to multi-level signaling and, more particularly, to a technique for receiving differential multi-PAM signals.

BACKGROUND OF THE INVENTION

In a typical binary signaling system, a signal may only be transmitted at one of two signal levels (i.e., a logic zero signal level or a logic one signal level). Thus, in such a binary signaling system, a signal may only represent one bit of data at a time (i.e., a data bit at a logic zero signal level or a data bit at a logic one signal level). In contrast, in a multi-level signaling system, a signal may be transmitted at one of multiple signal levels. For example, in a 4-PAM (4-level Pulse Amplitude Modulation) signaling system, a signal may be transmitted at one of four signal levels (i.e., a logic zero signal level, a logic one signal level, a logic two signal level, or a logic three signal level). Thus, in such a 4-PAM signaling system, a signal may represent two bits of data at a time (i.e., two data bits (i.e., 00) represented by a logic zero signal level, two data bits (i.e., 01) represented by a logic one signal level, two data bits (i.e., 10) represented by a logic two signal level, or two data bits (i.e., 11) represented by a logic three signal level).

Referring to FIG. 1, the various signal waveforms for a single-ended 4-PAM signaling system are shown, along with reference levels (i.e., $V_{refH}$, $V_{refM}$, and $V_{refL}$), logic signal levels (i.e., in Gray code sequence 0, 1, 3, and 2), and logic signal level binary values (i.e., in Gray code sequence 00, 01, 11, and 10). The reference levels are used to determine most significant bits (MSBs) and least significant bits (LSBs) of signals in terms of the logic signal level binary values. That is, the MSB of a signal may be extracted by a simple comparison of the signal to the $V_{refM}$ reference level. In contrast, the LSB of a signal must be extracted through a simultaneous comparison of the signal to both the $V_{refH}$ and $V_{refL}$ reference levels.

Referring to FIG. 2, there is shown a circuit 200 for extracting the LSB of a signal in a single-ended 4-PAM signaling system. As shown in FIG. 2, the circuit 200 comprises multiple transistors 202 and resistive elements 204. The circuit 200 receives a single-ended 4-PAM input signal (i.e., $V_{in}$), along with $V_{refH}$ and $V_{refL}$ reference level voltage signals and a bias voltage signal (i.e., $V_{Bias}$), and generates a pair of complementary output voltage signals (i.e., $V_{out}$ and $V_{outb}$) indicating the state of the LSB in the single-ended 4-PAM input signal (i.e., $V_{in}$).

Single-ended multi-level signaling systems, such as the single-ended 4-PAM signaling system discussed above, are often implemented to alleviate signal attenuation problems which are frequently encountered in high-speed (e.g., above 5 Gb/s) serial link channels, which are often found in backplane environments. However, despite the benefits obtained through the use of single-ended multi-level signaling systems, further solutions may also be required to address such signal attenuation problems. One such solution is realized through the use of differential multi-level signaling systems due primarily to the benefits that differential signaling offers in the area of common-mode noise rejection.

Referring to FIG. 3, differential signal waveforms (i.e., $V_{in}(+)$ and $V_{in}(-)$) for a differential 4-PAM signaling system are shown, along with reference levels (i.e., $V_{refH}$, $V_{refM}$, and $V_{refL}$), differential logic signal level binary values (i.e., in Gray code sequence 00, 01, 11, and 10), $V_{in}(-)$ logic signal levels (i.e., in Gray code sequence 0, 1, 3, and 2), and $V_{in}(-)$ MSB & LSB logic value ranges. Analogous to the case for the single-ended 4-PAM signaling system described above, the reference levels are used to determine MSBs and LSBs of differential signals in terms of the differential logic signal level binary values. That is, the MSB of a differential signal may be extracted by a simple differential comparison of the differential signal to the $V_{refM}$ reference level. In contrast, the LSB of a differential signal must be extracted through a simultaneous comparison of the differential signal to both the $V_{refH}$ and $V_{refL}$ reference levels. This simultaneous comparison is preferably performed by a differential window comparator.

Referring to FIG. 4A, there is shown a circuit 400 for extracting the LSB and MSB of a differential signal in a differential 4-PAM signaling system. As shown in FIG. 4A, the circuit 400 comprises a preamplifier stage 402, a regenerative amplifier stage 404, and a Gray decoder stage 406. The circuit 400 receives a differential 4-PAM input signal (i.e., $V_{in}(+)$ and $V_{in}(-)$), along with a $V_{ref}$ reference level voltage signal, and generates a pair of output voltage signals (i.e., $V_{LSB}$ and $V_{MSB}$) indicating the states of the LSB and the MSB in the differential 4-PAM input signal (i.e., $V_{in}(+)$ and $V_{in}(-)$).

Referring to FIG. 4B, there is shown a more detailed schematic diagram of the preamplifier stage 402 shown in FIG. 4A. Specifically, FIG. 4B shows that the preamplifier stage 402 comprises a plurality of transistors 408 and a plurality of resistive elements 410. The preamplifier stage 402 uses the single reference level voltage signal (i.e., $V_{ref}$) to introduce offset into two different LSB-extracting transistor pairs.

Referring to FIG. 4C, the relationship between the reference level voltage signal (i.e., $V_{ref}$) and the signal levels of the differential 4-PAM input signal (i.e., $V_{in}(+)$ and $V_{in}(-)$) is shown.

As demonstrated above, in differential multi-PAM systems, the MSB of a differential signal may be extracted by a simple differential comparison of the differential signal to a single reference level (e.g., ground). In contrast, the LSB of a differential signal must be extracted through a simultaneous comparison of the differential signal to multiple reference levels. Further, in Gray code based systems, voltage differences in the differential signal are smaller in the region where the LSB=1, which occupies the center band of the differential signal. In contrast, in Gray code based systems, voltage differences in the differential signal are larger in the region where the LSB=0, which occupies the outer bands of the differential signal. Accordingly, a highly accurate differential window comparator and related circuitry is required for reliable LSB extraction operations.

In view of the foregoing, it would be desirable to provide a technique for receiving differential multi-PAM signals which operates in an efficient and cost effective manner.

SUMMARY OF THE INVENTION

According to the present invention, a technique for receiving differential multi-PAM signals is provided. In one particular exemplary embodiment, the technique may be realized as a differential multi-PAM extractor circuit. In this particular exemplary embodiment, the differential multi-PAM extractor circuit comprises an upper LSB sampler circuit configured to receive a differential multi-PAM input signal and a first differential reference signal, and to generate a first differential sampled output signal. The differential multi-PAM extractor circuit also comprises a lower LSB sampler circuit configured to receive the differential multi-PAM input signal and a second differential reference signal, and to generate a second differential sampled output signal. The differential multi-PAM extractor circuit further comprises a combiner circuit configured to receive the first differential sampled output signal and the second differential sampled output signal, and to generate a differential LSB output signal indicating an LSB value of the differential multi-PAM input signal.

In accordance with other aspects of this particular exemplary embodiment of the present invention, the differential multi-PAM extractor circuit may further beneficially comprise an MSB sampler circuit configured to receive the differential multi-PAM input signal and a reference signal, and to generate a differential MSB output signal indicating an MSB value of the differential multi-PAM input signal.

In accordance with further aspects of this particular exemplary embodiment of the present invention, the first differential reference signal and the second differential reference signal may beneficially be the same differential reference signal or different differential reference signals. If the first differential reference signal and the second differential reference signal are different differential reference signals, then the first and second differential reference signals may beneficially have similar voltage levels, but be opposite in polarity. In either case, the first and second differential reference signals may beneficially have a common-mode similar to the differential multi-PAM input signal.

In accordance with additional aspects of this particular exemplary embodiment of the present invention, the upper LSB sampler circuit and the lower LSB sampler circuit may beneficially comprise first and second pairs of input transistors configured to receive the differential multi-PAM input signal. The upper LSB sampler circuit and the lower LSB sampler circuit may also beneficially comprise first and second pairs of offset transistors, coupled to the first and second pairs of input transistors, respectively, and configured to receive the first and second differential reference signals, respectively. The upper LSB sampler circuit and the lower LSB sampler circuit may further beneficially comprise first and second linear loads coupled to the first and second pairs of input transistors and the first and second pairs of offset transistors, respectively. The upper LSB sampler circuit and the lower LSB sampler circuit may additionally beneficially comprise a plurality of current sources coupled to the first and second pairs of input transistors and the first and second pairs of offset transistors, wherein first and second differential output signals are generated based upon the values of the differential multi-PAM input signal and the first and second differential reference signals, respectively. If such is the case, the upper LSB sampler circuit and the lower LSB sampler circuit may still further beneficially comprise first and second sampler devices, coupled to the first and second pairs of input transistors and the first and second pairs of offset transistors, respectively, and configured to sample the first and second differential output signals, respectively, and to generate the first and second differential sampled output signals, respectively, wherein the first and second sampler devices are clocked at a sampling rate. Also, if such is the case, the combiner circuit may beneficially comprise an exclusive OR logic device configured to receive the first and second differential sampled output signals and to generate the differential LSB output signal.

Alternatively, in accordance with additional aspects of this particular exemplary embodiment of the present invention, the upper LSB sampler circuit and the lower LSB sampler circuit may beneficially comprise first and second pairs of input transistors configured to receive the differential multi-PAM input signal. The upper LSB sampler circuit and the lower LSB sampler circuit may also beneficially comprise first and second pairs of offset transistors, coupled to the first and second pairs of input transistors, respectively, and configured to receive the first and second differential reference signals, respectively. The upper LSB sampler circuit and the lower LSB sampler circuit may further beneficially comprise first and second nonlinear loads coupled to the first and second pairs of input transistors and the first and second pairs of offset transistors, respectively. The upper LSB sampler circuit and the lower LSB sampler circuit may additionally beneficially comprise a plurality of switches coupled to the first and second pairs of input transistors and the first and second pairs of offset transistors, wherein first and second differential output signals are generated based upon the values of the differential multi-PAM input signal and the first and second differential reference signals, respectively. If such is the case, the plurality of switches may be beneficially are clocked at a sampling rate. The first and second nonlinear loads may also be beneficially clocked at the sampling rate for sampling the first and second differential output signals, respectively, and for generating first and second differential sampled output signals, respectively. Also, if such is the case, the combiner circuit may beneficially comprise an exclusive OR logic device configured to receive the first and second differential sampled output signals and to generate the differential LSB output signal.

In another particular exemplary embodiment, the technique may also be realized as a differential multi-PAM extractor circuit. In this particular exemplary embodiment, the differential multi-PAM extractor circuit comprises a pair of input transistors configured to receive a differential multi-PAM input signal, and a pair of equalization transistors, coupled to the pair of input transistors, and configured to receive a differential equalization signal. The differential multi-PAM extractor circuit also comprises a linear load coupled to the pair of input transistors and the pair of equalization transistors, and a pair of current sources coupled to the pair of input transistors and the pair of equalization transistors. The differential equalization signal may beneficially have a common-mode similar to the differential multi-PAM input signal.

In still another particular exemplary embodiment, the technique may also be realized as a differential multi-PAM extractor circuit. In this particular exemplary embodiment, the differential multi-PAM extractor circuit comprises a pair of input transistors configured to receive a differential multi-PAM input signal, and a pair of equalization transistors, coupled to the pair of input transistors, and configured to receive a differential equalization signal. The differential multi-PAM extractor circuit also comprises a nonlinear load coupled to the pair of input transistors and the pair of equalization transistors, and a pair of switches coupled to the pair of input transistors and the pair of equalization transistors, wherein the pair of switches are clocked at a sampling rate. The nonlinear load may beneficially be clocked at the sampling rate for sampling a differential output signal, and for generating a sampled output signal. Also, the differential equalization signal may beneficially have a common-mode similar to the differential multi-PAM input signal.

In still another particular exemplary embodiment, the technique may also be realized as a differential multi-PAM extractor circuit. In this particular exemplary embodiment, the differential multi-PAM extractor circuit comprises first and second pairs of input transistors configured to receive a differential multi-PAM input signal, and first and second pairs of adjustable resistive elements, coupled to the first and second pairs of input transistors, respectively, and configured to receive a differential control signal. The differential multi-PAM extractor circuit also comprises a load coupled to the first and second pairs of input transistors, and a pair of current sources coupled to the first and second pairs of adjustable resistive elements, respectively. The differential control signal may beneficially be applied to the first and second pairs of adjustable resistance elements so as to adjust their resistance value. Also, the first and second pairs of adjustable resistance elements may beneficially comprise field effect transistors having gates that are controlled by the differential control signal.

In yet another particular exemplary embodiment, the technique may also be realized as a differential multi-PAM extractor circuit. In this particular exemplary embodiment, the differential multi-PAM extractor circuit comprises first and second pairs of adjustable voltage sources connected in series with signal paths for a differential multi-PAM input signal, wherein the first and second pairs of adjustable voltage sources configured to receive a differential control signal. The differential multi-PAM extractor circuit also comprises first and second pairs of input transistors, coupled to the first and second pairs of adjustable voltage sources, respectively, and configured to receive voltage adjusted differential multi-PAM input signals from the first and second pairs of adjustable voltage sources, respectively. The differential multi-PAM extractor circuit further comprises a load coupled to the plurality of pairs of unbalanced input transistors, and a pair of current sources coupled to the first and second pairs of input transistors, respectively. The differential control signal may beneficially be applied to the first and second pairs of adjustable voltage sources so as to adjust their voltage value. Also, the first and second pairs of adjustable voltage sources may beneficially comprise resistor divider circuits. For example, the resistor divider circuits may beneficially comprise an adjustable resistive element or an adjustable voltage source.

In yet another particular exemplary embodiment, the technique may also be realized as a differential multi-PAM extractor circuit. In this particular exemplary embodiment, the differential multi-PAM extractor circuit comprises a differential amplifier circuit configured to receive a differential multi-PAM input signal and to generate an amplified differential multi-PAM signal. The differential multi-PAM extractor circuit also comprises a differential automatic gain control circuit, coupled to the differential amplifier circuit, and configured to control gain in the differential amplifier circuit. The differential multi-PAM extractor circuit further comprises a first differential sampler circuit, coupled to the differential amplifier circuit and the differential automatic gain control circuit, and configured to sample the amplified differential multi-PAM signal and to generate a first output signal indicating a most significant bit value of the differential multi-PAM input signal. The differential multi-PAM extractor circuit additionally comprises a second differential sampler circuit, coupled to the differential amplifier circuit and the differential automatic gain control circuit, and configured to sample the amplified differential multi-PAM signal and to generate a second output signal indicating a least significant bit value of the differential multi-PAM input signal. The first and second differential sampler circuits are clocked at a sampling rate.

In yet another particular exemplary embodiment, the technique may also be realized as a differential multi-PAM extractor circuit. In this particular exemplary embodiment, the differential multi-PAM extractor circuit comprises a first differential amplifier circuit configured to receive a differential multi-PAM input signal and to generate a first amplified differential multi-PAM signal, and a second differential amplifier circuit configured to receive the differential multi-PAM input signal and to generate a second amplified differential multi-PAM signal. The differential multi-PAM extractor circuit also comprises a first differential automatic gain control circuit, coupled to the first differential amplifier circuit, and configured to control gain in the first differential amplifier circuit, and a second differential automatic gain control circuit, coupled to the second differential amplifier circuit, and configured to control gain in the second differential amplifier circuit. The differential multi-PAM extractor circuit further comprises a first differential sampler circuit, coupled to the first differential amplifier circuit and the first differential automatic gain control circuit, and configured to sample the first amplified differential multi-PAM signal and to generate a first output signal indicating a most significant bit value of the differential multi-PAM input signal. The differential multi-PAM extractor circuit additionally comprises a second differential sampler circuit, coupled to the second differential amplifier circuit and the second differential automatic gain control circuit, and configured to sample the second amplified differential multi-PAM signal and to generate a second output signal indicating a least significant bit value of the differential multi-PAM input signal. The first and second differential sampler circuits are clocked at a sampling rate.

In yet another particular exemplary embodiment, the technique may also be realized as a differential multi-PAM extractor circuit. In this particular exemplary embodiment, the differential multi-PAM extractor circuit comprises a first differential amplifier circuit configured to receive a differential multi-PAM input signal and to generate a first amplified differential multi-PAM signal, and a second differential amplifier circuit configured to receive the differential multi-PAM input signal and to generate a second amplified differential multi-PAM signal. The differential multi-PAM extractor circuit also comprises a differential automatic gain control circuit, coupled to the first differential amplifier circuit and the second differential amplifier circuit, and configured to control gain in the first differential amplifier circuit and the second differential amplifier circuit based at least in part upon the first amplified differential multi-PAM signal. The differential multi-PAM extractor circuit further comprises a first differential sampler circuit, coupled to the first differential amplifier circuit and the differential automatic gain control circuit, and configured to sample the first amplified differential multi-PAM signal and to generate a first output signal indicating a most significant bit value of the differential multi-PAM input signal. The differential multi-PAM extractor circuit additionally comprises a second differential sampler circuit, coupled to the second differential amplifier circuit, and configured to sample the second amplified differential multi-PAM signal and to generate a second output signal indicating a least significant bit value of the differential multi-PAM input signal. The first and second differential sampler circuits are clocked at a sampling rate.

In yet still another particular exemplary embodiment, the technique may also be realized as a differential multi-PAM extractor circuit. In this particular exemplary embodiment, the differential multi-PAM extractor circuit comprises a plurality of differential amplifier circuits configured to receive a differential multi-PAM input signal and to generate a plurality of amplified differential multi-PAM signals. The differential multi-PAM extractor circuit also comprises a plurality of adjustable offset voltage sources, coupled to the plurality of differential amplifier circuits, respectively, and configured to provide a plurality of offset voltage signals to the plurality of differential amplifier circuits, respectively. The differential multi-PAM extractor circuit further comprises a plurality of differential multiple-sampler circuits, coupled to the plurality of differential amplifier circuits, respectively, and configured to multiple-sample the plurality of amplified differential multi-PAM signals, respectively, to generate a plurality of multiple-sampled multi-PAM signals, respectively, and to determine a most significant bit value and a least significant bit value of the differential multi-PAM input signal.

In accordance with other aspects of this particular exemplary embodiment of the present invention, the differential multi-PAM extractor circuit may further beneficially comprise a plurality of deserializer circuits, coupled to the plurality of differential multiple-sampler circuits, and configured to receive the plurality of multiple-sampled multi-PAM signals and to generate parallel data blocks for determining the most significant bit value and the least significant bit value of the differential multi-PAM input signal. If such is the case, the plurality of deserializer circuits may also beneficially generate parallel data blocks for clock data recovery purposes or for calibration of the plurality of differential multiple-sampler circuits. Also, if such is the case, the differential multi-PAM extractor circuit may further beneficially comprise a parallel digital multiplexer, coupled to the plurality of deserializer circuits, and configured to direct the parallel data blocks. The plurality of deserializer circuits are clocked at a sampling rate. Also, the plurality of differential multiple-sampler circuits are clocked at a sampling rate. For example, the differential multi-PAM extractor circuit may further beneficially comprise clock generation circuitry configured to generate clock signals for the plurality of differential multiple-sampler circuits and the plurality of deserializer circuits.

In accordance with other aspects of this particular exemplary embodiment of the present invention, the differential multi-PAM extractor circuit may further beneficially comprise a plurality of analog multiplexers, mostly coupled to the plurality of differential amplifier circuits, and configured to direct the plurality of amplified differential multi-PAM signals and a differential multi-PAM calibration reference signal to the plurality of differential multiple-sampler circuits. If such is the case, the differential multi-PAM extractor circuit may further beneficially comprise a state machine configured to control the states of the plurality of analog multiplexers. Also, if such is the case, each of the plurality of differential multiple-sampler circuits may beneficially comprise an adjustable current source, a plurality of charge storage devices, switchably coupled to the adjustable current source, and configured to store a plurality of charges, respectively, supplied by the adjustable current source, and a plurality of clocked sampler devices, coupled to the plurality of analog multiplexers and the plurality of charge storage devices, respectively, and configured to periodically receive the differential multi-PAM calibration reference signal for calibrating a respective stored charge. Further, if such is the case, each of the plurality of differential multiple-sampler circuits may further beneficially comprise a plurality of switching devices, coupled between the adjustable current source and the plurality of charge storage devices, respectively, and configured to periodically connect the adjustable current source to the plurality of charge storage devices. Then, the differential multi-PAM extractor circuit may further beneficially comprise a state machine configured to control the states of the plurality of switching devices. Alternatively, each of the plurality of differential multiple-sampler circuits may further beneficially comprise an analog multiplexing device, coupled between the adjustable current source and the plurality of charge storage devices, and configured to periodically connect the adjustable current source to the plurality of charge storage devices. Then, the differential multi-PAM extractor circuit may further beneficially comprise a state machine configured to control the state of the analog multiplexing device. Alternatively still, each of the plurality of differential multiple-sampler circuits may further beneficially comprise a controller configured to control the adjustable current source. Then, the controller may beneficially be a state machine.

In accordance with further of this particular exemplary embodiment of the present invention, the differential multi-PAM extractor circuit may further beneficially comprise a state machine configured to control the states of the plurality of differential multiple-sampler circuits. Also, at least one of the plurality of adjustable offset voltage sources may beneficially comprise a precision digital-to-analog converter.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 8A shows an embodiment of a portion of a differential LSB extractor circuit in accordance with the present invention.

FIG. 8B shows a shift in the transfer function of the differential LSB extractor circuit portion of FIG. 8A as a result of unbalanced input transistors.

DETAILED DESCRIPTION OF EXEMPLARY EMBODIMENT(S)

Figure 1:
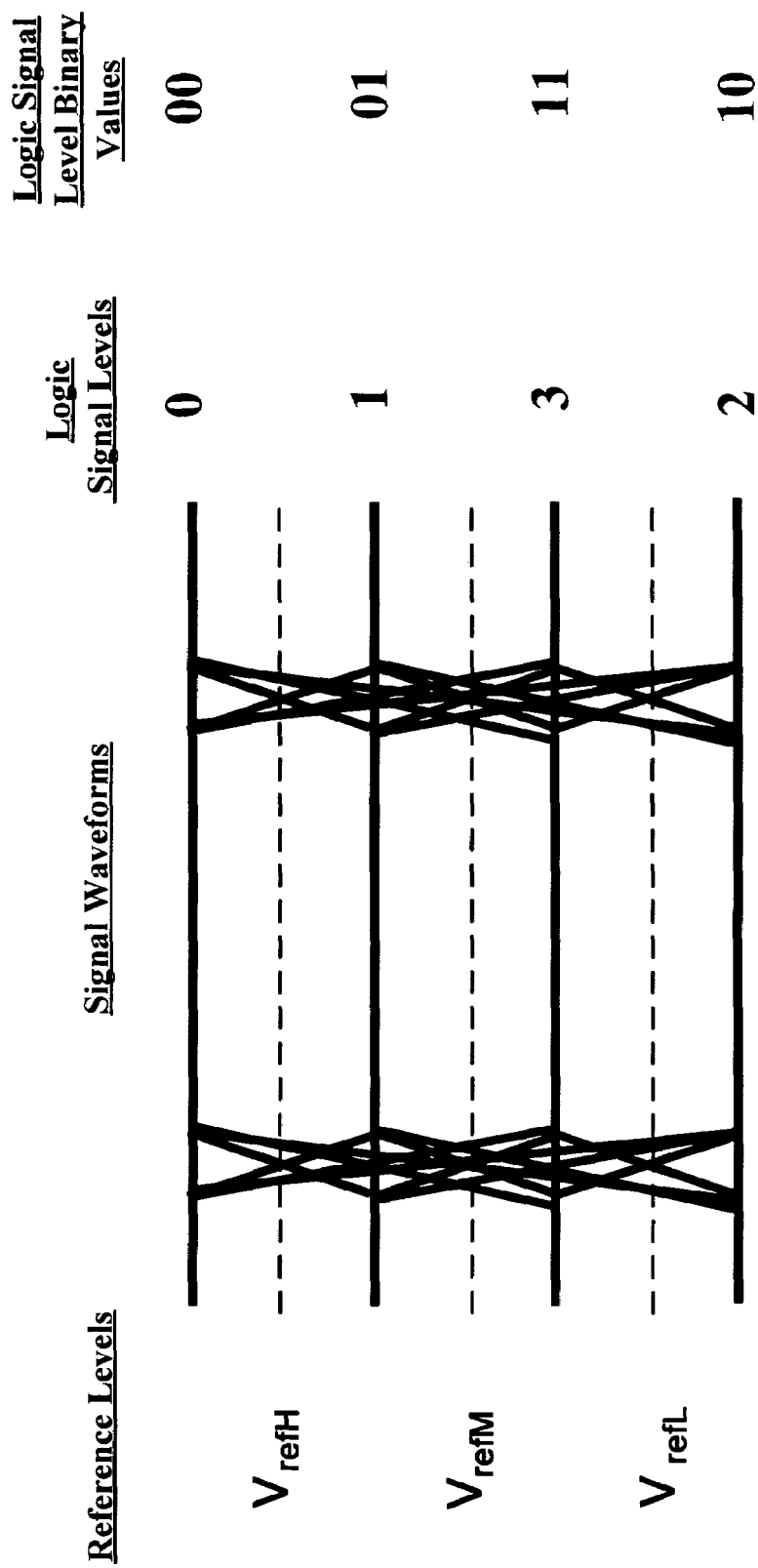
FIG. 1 shows the various signal waveforms for a single-ended 4-PAM signaling system.
Figure 2:
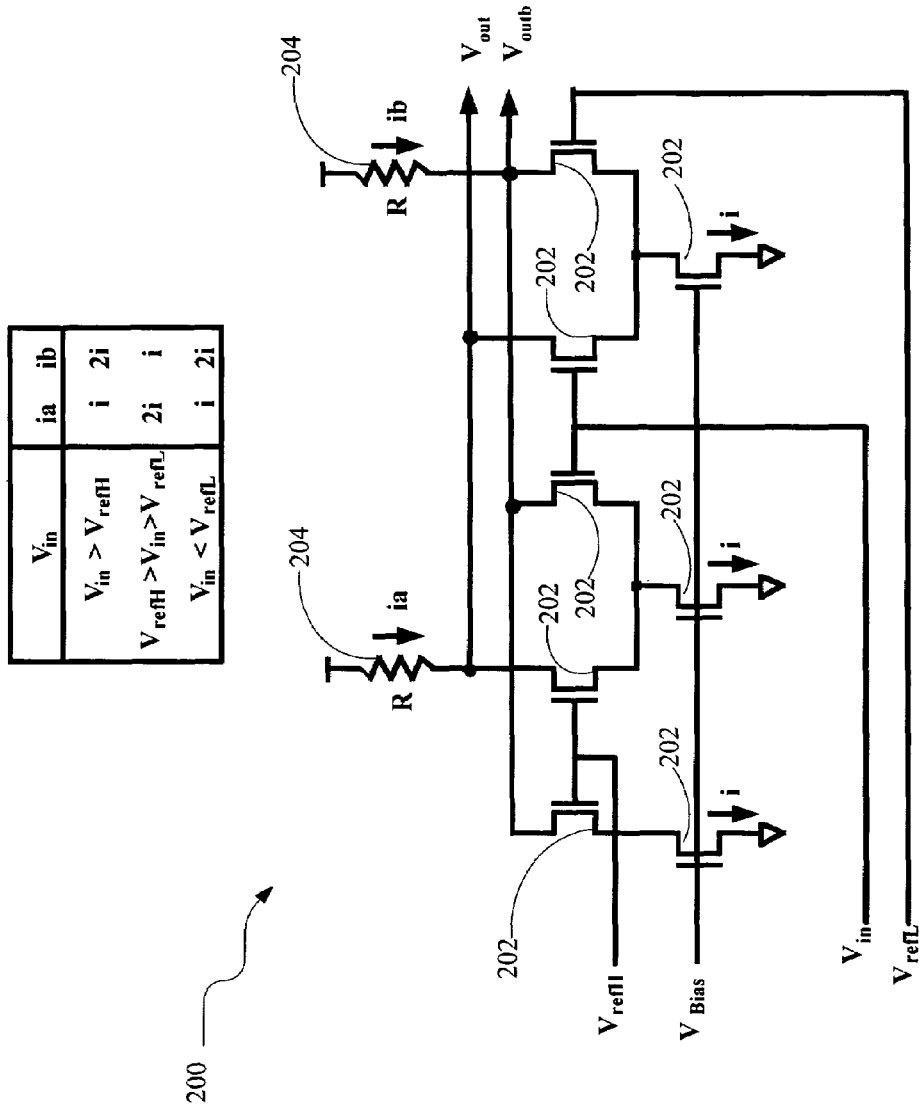
FIG. 2 shows a circuit for extracting the LSB of a signal in a single-ended 4-PAM signaling system.
Figure 3:
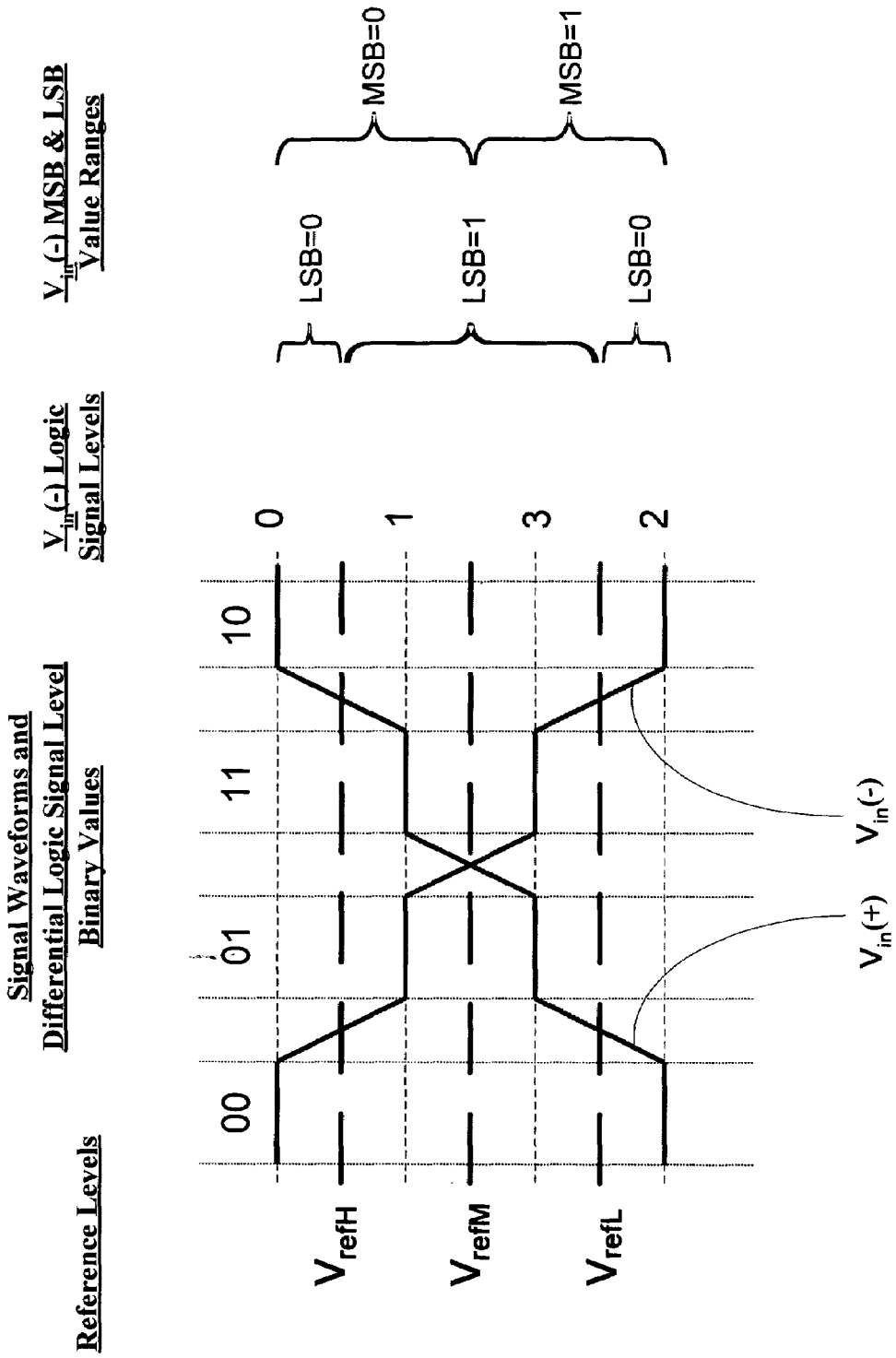
FIG. 3 shows differential signal waveforms for a differential 4-PAM signaling system.
Figure 4A:
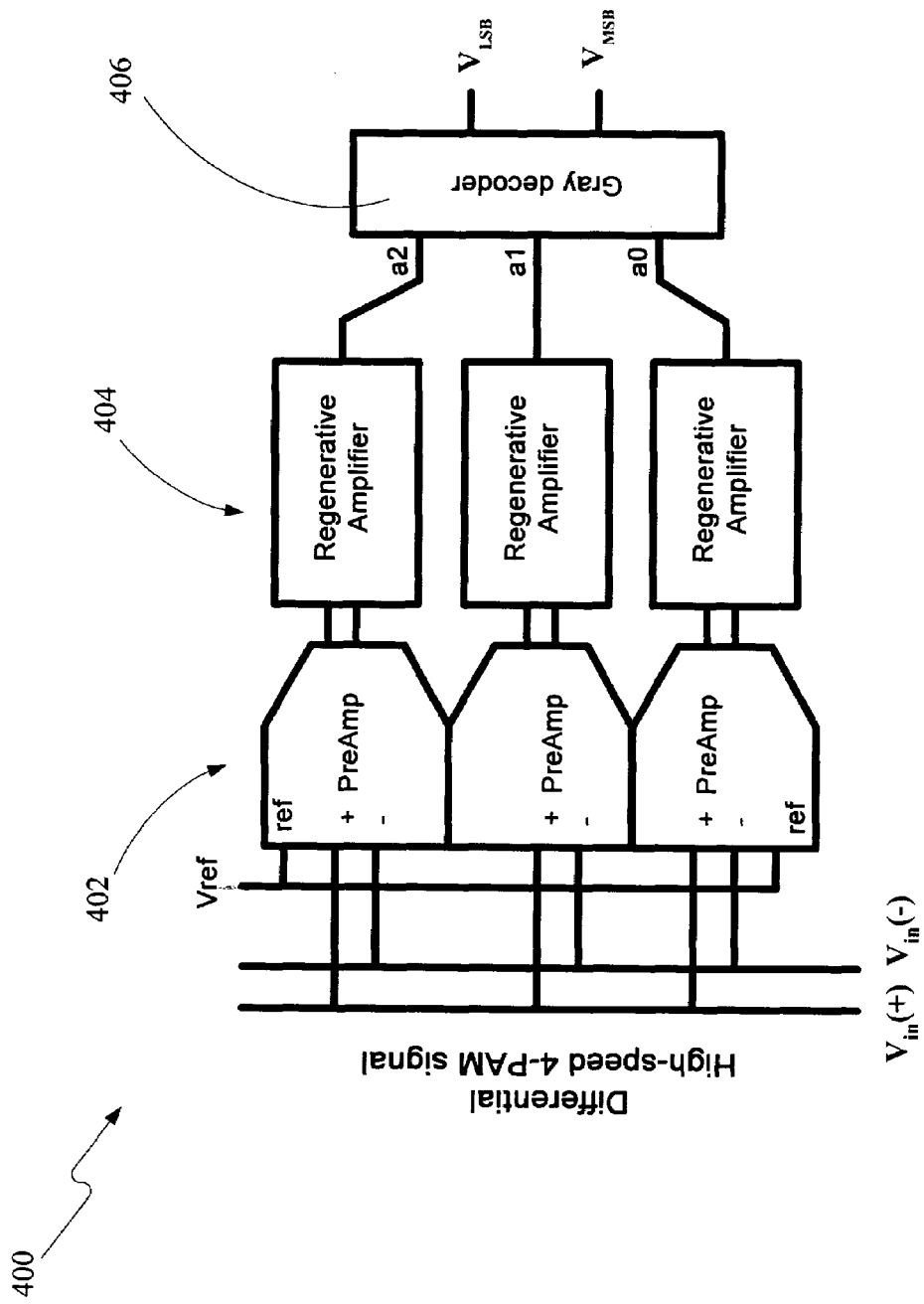
FIG. 4A shows a circuit for extracting the LSB and MSB of a differential signal in a differential 4-PAM signaling system.
Figure 4B:
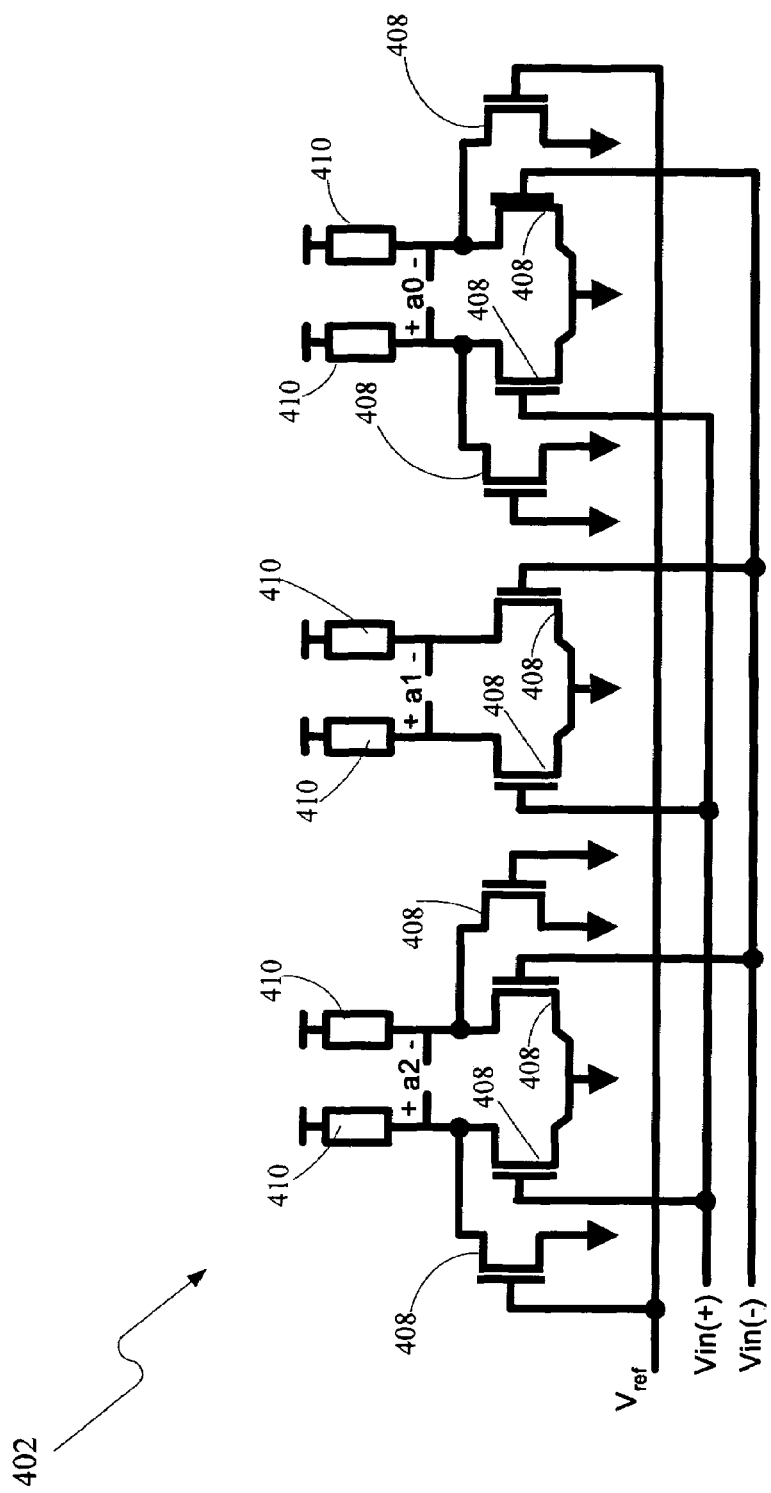
FIG. 4B shows a more detailed schematic diagram of the preamplifier stage shown in FIG. 4A.
Figure 4C:
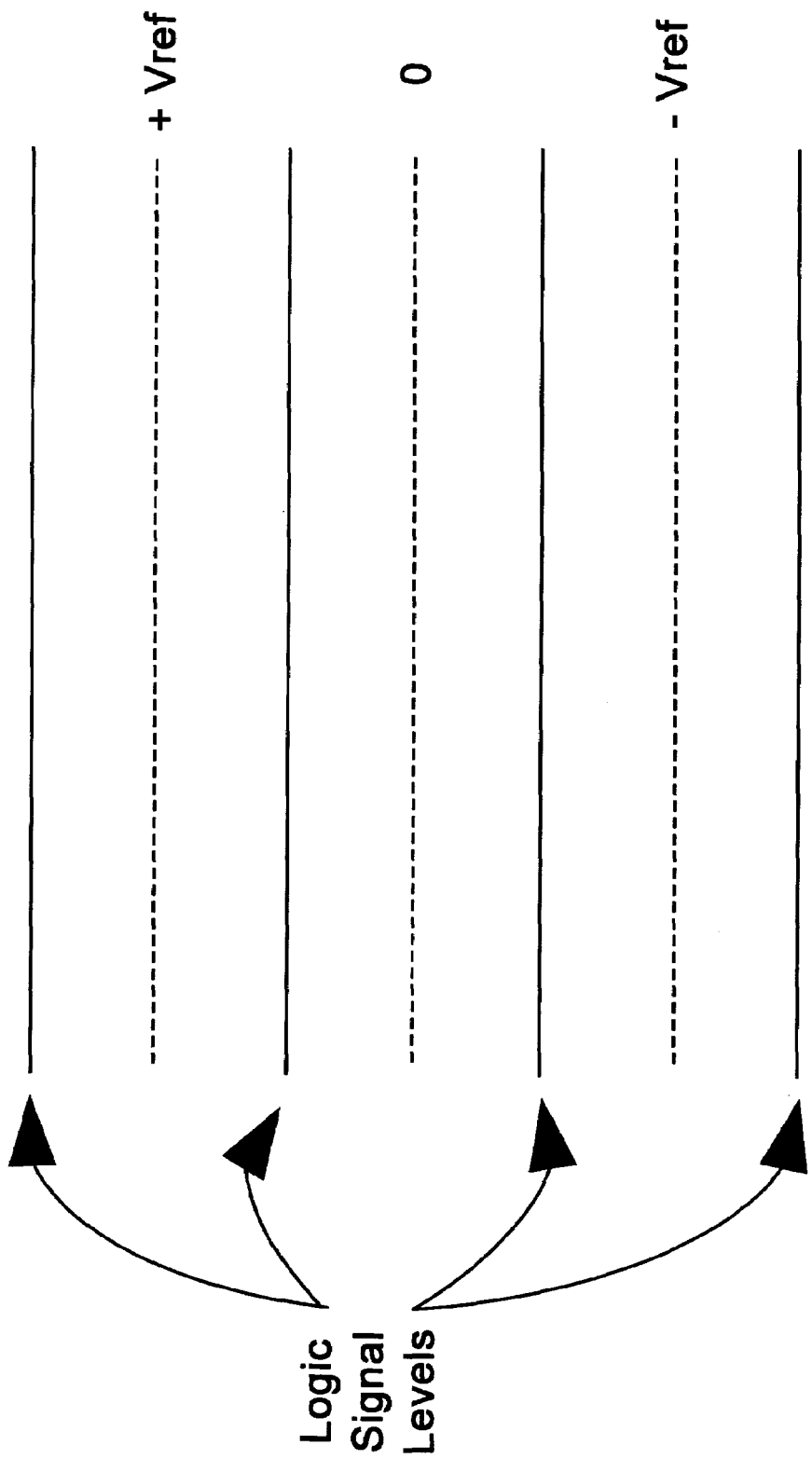
FIG. 4C shows the relationship between the reference level voltage signal and the signal levels of the differential 4-PAM input signal shown in FIGS. 4A and 4B.
Figure 5A:
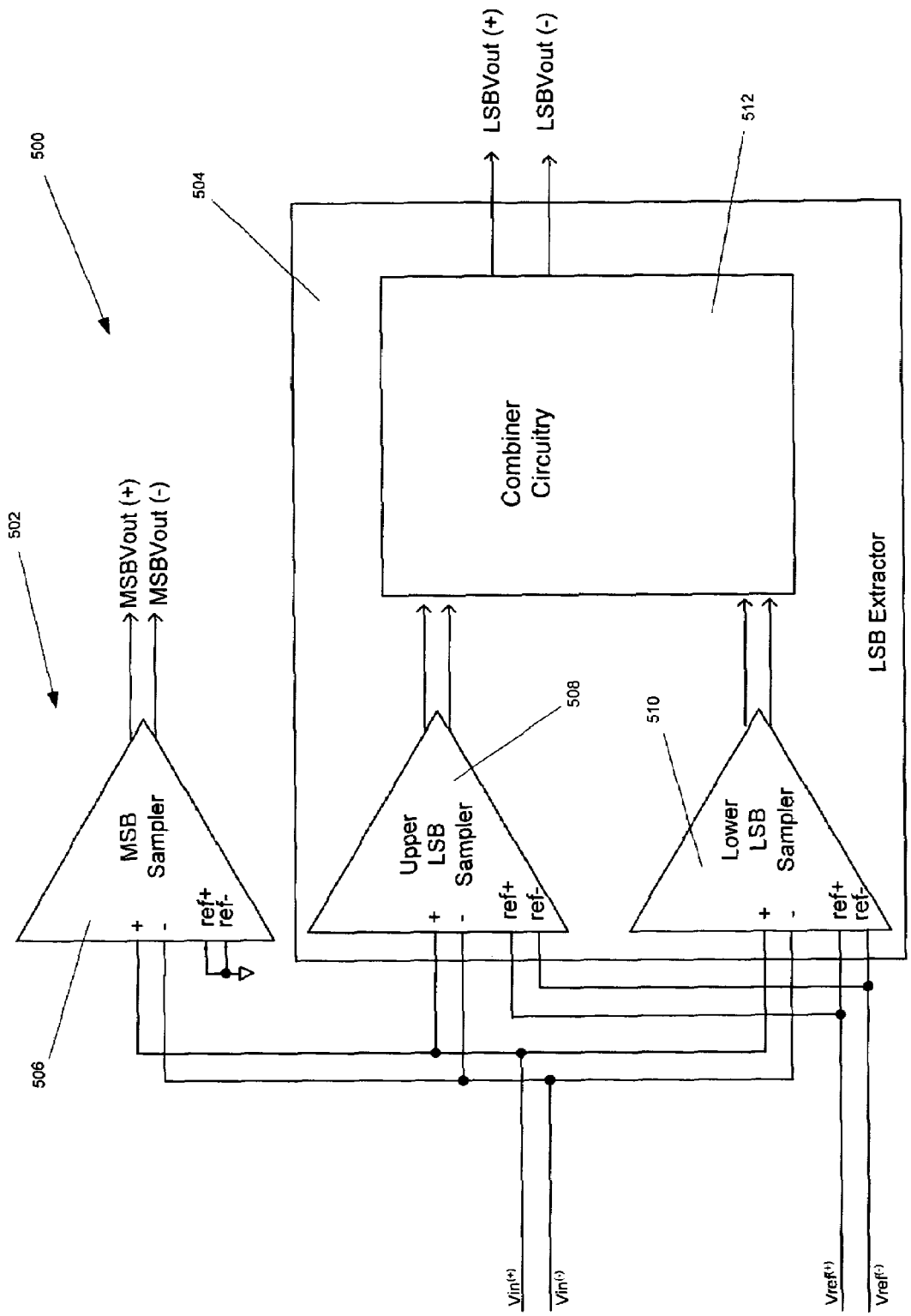
FIG. 5A shows a differential LSB and MSB extractor circuit for use in a differential 4-PAM signaling system in accordance with an embodiment of the present invention.

Referring to FIG. 5A, there is shown a differential LSB and MSB extractor circuit 500 for use in a differential 4-PAM signaling system in accordance with an embodiment of the present invention. The extractor circuit 500 comprises MSB extractor circuitry 502 and LSB extractor circuitry 504. The MSB extractor circuitry 502 comprises an MSB sampler circuit 506, which receives a differential 4-PAM input signal (i.e., $V_{in}(+)$ and $V_{in}(-)$) and a reference voltage (e.g., ground) and generates a differential output signal (i.e., $MSBV_{out}(+)$ and $MSBV_{out}(-)$) indicating the MSB value of the differential 4-PAM input signal (i.e., $V_{in}(+)$ and $V_{in}(-)$ The LSB extractor circuitry 504 comprises an upper LSB sampler circuit 508, a lower LSB sampler circuit 510, and combiner circuitry 512. The upper LSB sampler circuit 508 receives the differential 4-PAM input signal (i.e., $V_{in}(+)$ and $V_{in}(-)$) and a differential reference voltage (i.e., $V_{ref}(+)$ and $V_{ref}(-)$) and generates a differential output signal for use by the combiner circuitry 512. Similarly, the lower LSB sampler circuit 510 receives the differential 4-PAM input signal (i.e., $V_{in}(+)$ and $V_{in}(-)$) and the differential reference voltage (i.e., $V_{ref}(+)$ and $V_{ref}(-)$) and generates a differential output signal for use by the combiner circuitry 512. The combiner circuitry 512, which functionally operates to logically "exclusively OR" ("XOR") the differential signals received from the upper LSB sampler circuit 508 and the lower LSB sampler circuit 510, generates a differential output signal (i.e., $LSBV_{out}(+)$ and $LSBV_{out}(-)$) indicating the LSB value of the differential 4-PAM input signal (i.e., $V_{in}(+)$ and $V_{in}(-)$).

Figure 5B:
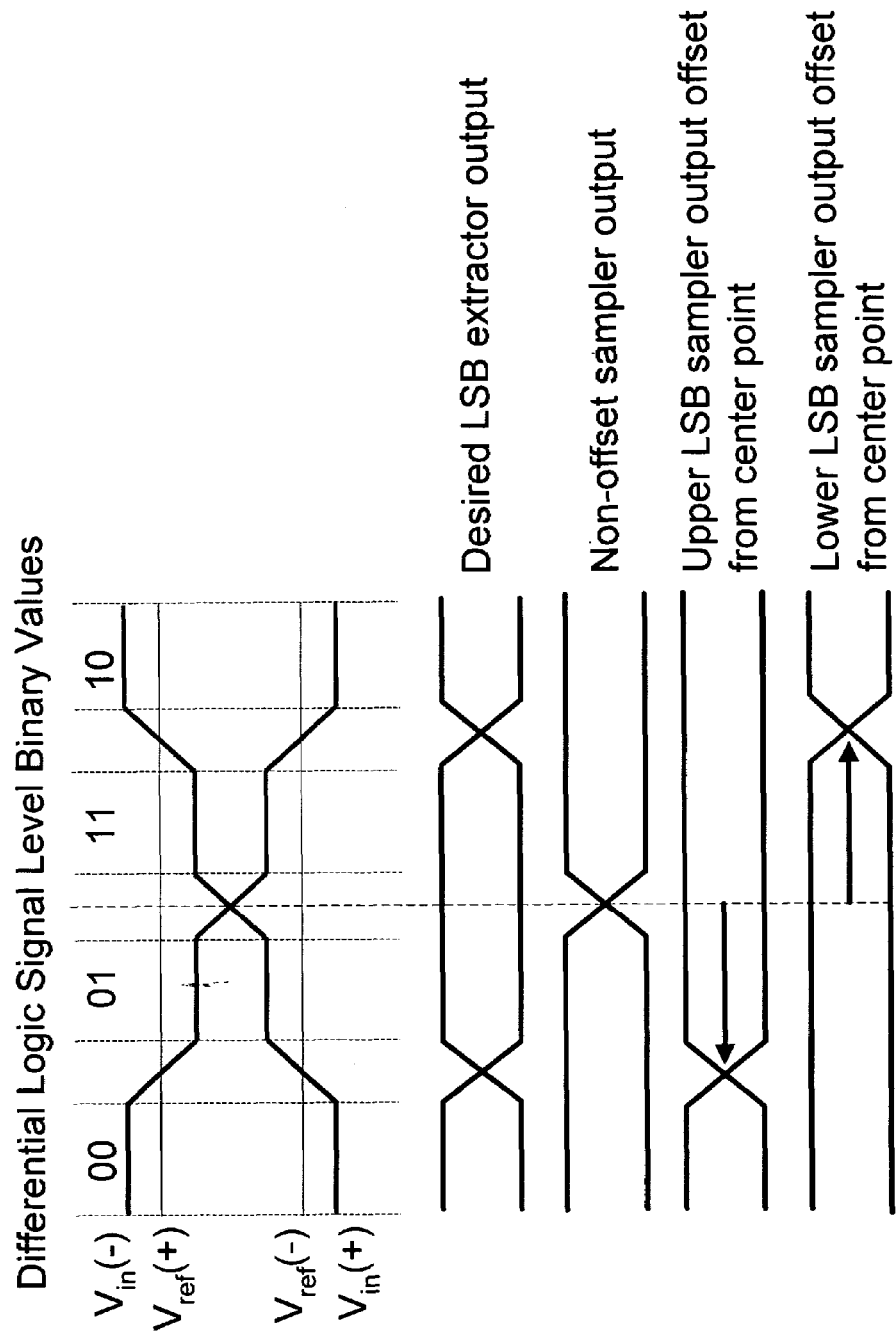
FIG. 5B shows differential signal waveforms for a differential 4-PAM signaling system, along with corresponding signal waveforms indicating how a desired LSB extractor output may be obtained in accordance with the present invention.

Referring to FIG. 5B, the differential 4-PAM input signal waveforms (i.e., $V_{in}(+)$ and $V_{in}(-)$) for the differential LSB and MSB extractor circuit 500 of FIG. 5A are shown, along with corresponding signal waveforms indicating how the desired LSB extractor output (i.e., the differential output signal (i.e., LSBV$_{out}$(+) and LSBV$_{out}$(−)) is obtained in accordance with the present invention by simply summing two different pairs of differential signals from the upper LSB sampler circuit 508 and the lower LSB sampler circuit 510, which are offset from their respective centerpoints.

Figure 6:
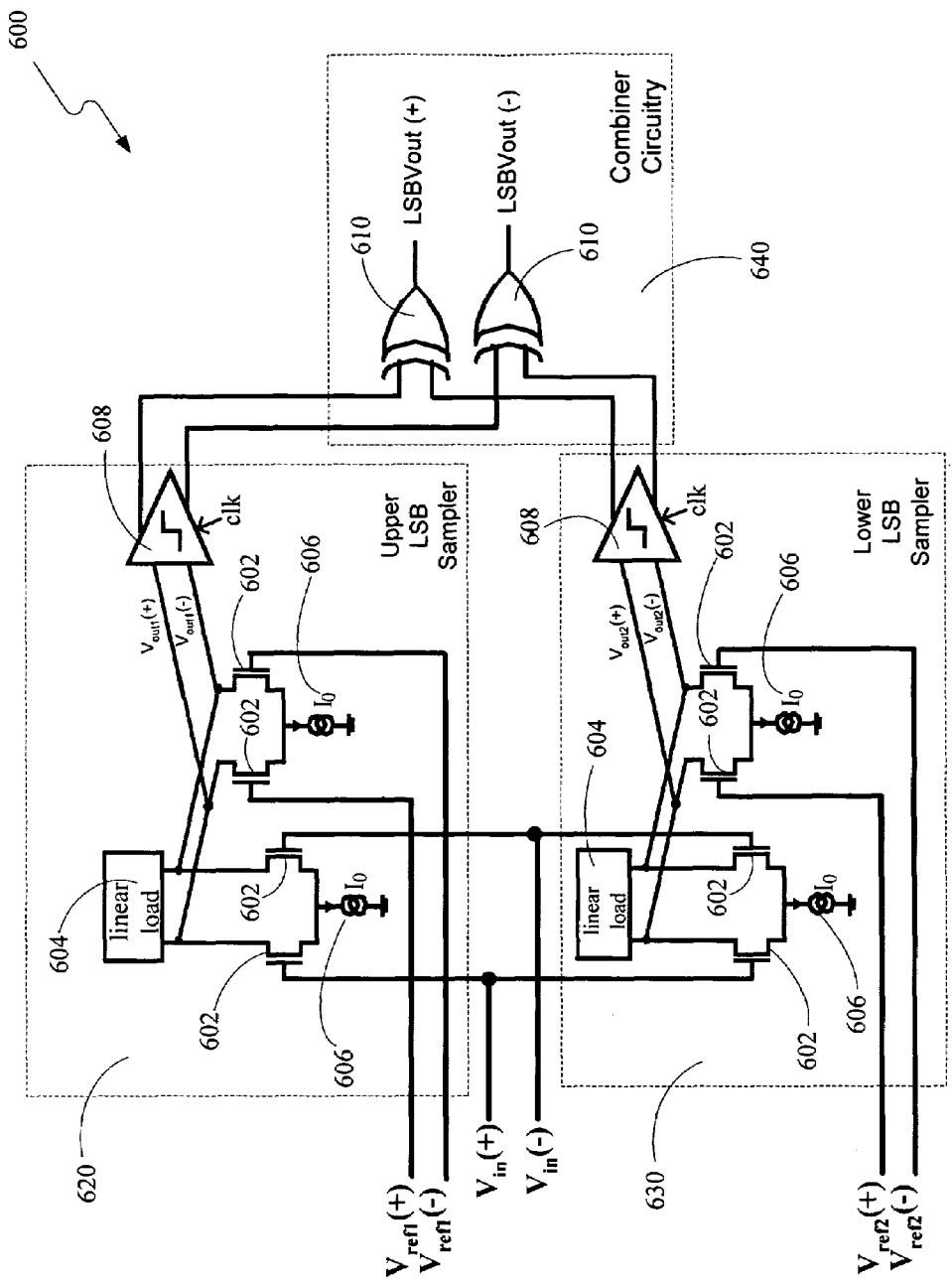
FIG. 6 shows an alternate embodiment of a differential LSB extractor circuit in accordance with the present invention.

Referring to FIG. 6, there is shown an alternate embodiment of a differential LSB extractor circuit 600 in accordance with the present invention. The differential LSB extractor circuit 600 comprises a plurality of transistors 602, a pair of linear loads 604, a plurality of current sources 606, a pair of differential clocked sampler devices 608, and a pair of differential exclusive OR logic devices 610, which are all arranged to extract the LSB value from a differential 4-PAM input signal (i.e., V$_{in}$(+) and V$_{in}$(−)). More specifically, the differential LSB extractor circuit 600 receives the differential 4-PAM input signal (i.e., V$_{in}$(+) and V$_{in}$(−)) at complementary input transistor pairs, which regulate current through the linear loads 604 and respective ones of the plurality of current sources 606. A pair of differential reference voltage signals (i.e., V$_{ref1}$ and V$_{ref2}$) are applied to respective transistor pairs, which are coupled to respective ones of the complementary input transistor pairs and regulate current through the linear loads 604 and respective ones of the plurality of current sources 606. Each differential clocked sampler device 608 is coupled to an output of a respective transistor pair grouping. Outputs from the differential clocked sampler devices 608 are exclusively ORed by the pair of differential exclusive OR logic devices 610 to provide a differential output signal (i.e., LSBV$_{out}$(+) and LSBV$_{out}$(−)) indicating the LSB value of the differential 4-PAM input signal (i.e., V$_{in}$(+) and V$_{in}$(−)).

Similar to the LSB extractor circuitry 504 of FIG. 5, the differential LSB extractor circuit 600 of FIG. 6 comprises an upper LSB sampler circuit 620, a lower LSB sampler circuit 630, and combiner circuitry 640, as indicated by the dashed line boxes in FIG. 6. Within both the upper LSB sampler circuit 620 and the lower LSB sampler circuit 630, the complementary input transistor pairs, the linear loads 604, and the corresponding current sources 606 combine to operate as linear preamplifiers. The transistor pairs and the corresponding current sources 606 which are coupled to these linear preamplifiers combine to create an offset in the outputs of these linear preamplifiers. The differential clocked sampler devices 608 then operate as zero-crossing detectors.

For example, for the upper LSB sampler circuit 620, A*[(V$_{in}$(+)−V$_{in}$(−))+(V$_{ref1}$(+)−V$_{ref1}$(−))]=V$_{out}$(+)−V$_{out1}$(−), and for the lower LSB sampler circuit 630, A*[(V$_{in}$(+)−V$_{in}$(−))−(V$_{ref2}$(+)−V$_{ref2}$(−))]=V$_{out2}$(+)−V$_{out2}$(−), wherein A is the gain of the respective linear preamplifiers, wherein V$_{ref1}$(+)/(−) may correspond to V$_{ref}$(+)/(−) in the waveforms of FIG. 5B, and wherein V$_{ref2}$(+)/(−) may correspond to V$_{ref}$(−)/(+) in the waveforms of FIG. 5B. Thus, the upper LSB sampler circuit 620 has a zero-crossing when (V$_{in}$(+)−V$_{in}$(−))=−(V$_{ref1}$(+)−V$_{ref1}$(−)), and the lower LSB sampler circuit 630 has a zero-crossing when (V$_{in}$(+)−V$_{in}$(−))=−(V$_{ref2}$(+)−V$_{ref2}$(−)).

In one embodiment, the pair of differential reference voltage signals (i.e., V$_{ref1}$ and V$_{ref2}$) may simply be the same voltage level, but reversed in polarity. In a preferred embodiment, the pair of differential reference voltage signals (i.e., V$_{ref1}$ and V$_{ref2}$) will also have the same common-mode as the differential 4-PAM input signal (i.e., V$_{in}$(+) and V$_{in}$(−)) in order to match currents and offset ranges.

Figure 7:
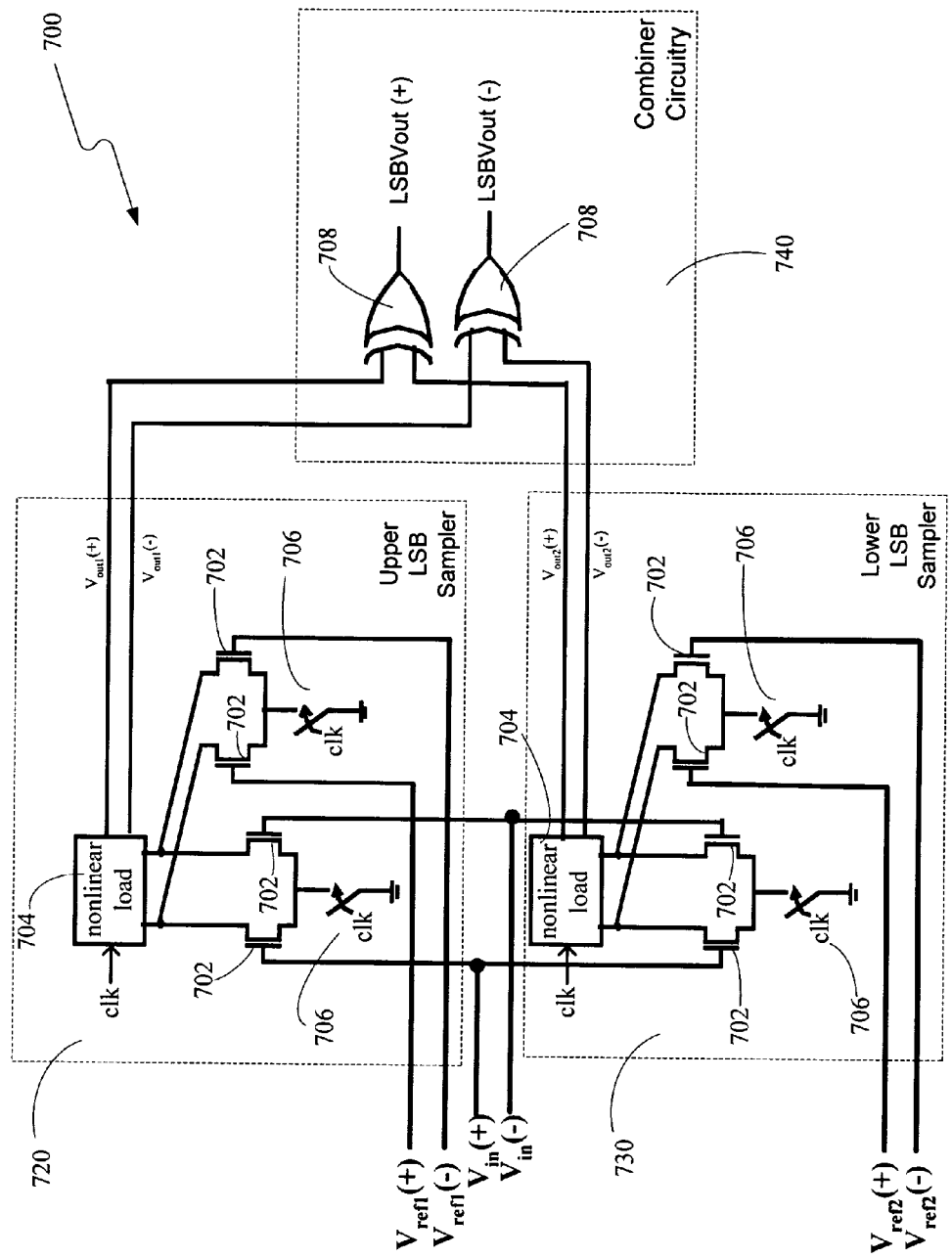
FIG. 7 shows another alternate embodiment of a differential LSB extractor circuit in accordance with the present invention.

Referring to FIG. 7, there is shown another alternate embodiment of a differential LSB extractor circuit 700 in accordance with the present invention. The differential LSB extractor circuit 700 comprises a plurality of transistors 702, a pair of differential clocked nonlinear loads 704, a plurality of clocked switches 706, and a pair of differential exclusive OR logic devices 708, which are all arranged to extract the LSB value from a differential 4-PAM input signal (i.e., V$_{in}$(+) and V$_{in}$(−)). More specifically, the differential LSB extractor circuit 700 receives the differential 4-PAM input signal (i.e., V$_{in}$(+) and V$_{in}$(−)) at complementary input transistor pairs, which regulate current through the differential clocked nonlinear loads 704 and respective ones of the plurality of clocked switches 706. A pair of differential reference voltage signals (i.e., V$_{ref1}$ and V$_{ref2}$) are applied to respective transistor pairs, which are coupled to respective ones of the complementary input transistor pairs and regulate current through the differential clocked nonlinear loads 704 and respective ones of the plurality of clocked switches 706. Outputs from the differential clocked nonlinear loads 704 are exclusively ORed by the pair of differential exclusive OR logic devices 610 to provide a differential output signal (i.e., LSBV$_{out}$(+) and LSBV$_{out}$(−)) indicating the LSB value of the differential 4-PAM input signal (i.e., V$_{in}$(+) and V$_{in}$(−)).

Similar to the LSB extractor circuitry 504 of FIG. 5 and the extractor circuit 600 of FIG. 6, the differential LSB extractor circuit 700 of FIG. 7 comprises an upper LSB sampler circuit 720, a lower LSB sampler circuit 730, and combiner circuitry 740, as indicated by the dashed line boxes in FIG. 7. Within both the upper LSB sampler circuit 720 and the lower LSB sampler circuit 730, the complementary input transistor pairs, the differential clocked nonlinear loads 704, and the corresponding clocked switches 706 combine to operate as zero-crossing detectors. The transistor pairs and the corresponding clocked switches 706 which are coupled to these zero-crossing detectors combine to create an offset in these zero-crossing detectors.

For example, for the upper LSB sampler circuit 720, f[(V$_{in}$(+)−V$_{in}$(−))+(V$_{ref1}$(+)−V$_{ref1}$(−))]=V$_{out1}$(+)−V$_{out1}$(−), and for the lower LSB sampler circuit 730, f[(V$_{in}$(+)−V$_{in}$(−))−(V$_{ref2}$(+)−V$_{ref2}$(−))]=V$_{out2}$(+)−V$_{out2}$(−), wherein f is a non-linear function realized from upper and lower LSB sampler circuits 720 and 730, wherein f is, ideally, the signum function such that y=1 when x>0, y=0 when x=0, y=−1 when x<0, or, actually, close to the function y=tanh(x). Again, V$_{ref1}$(+)/(−) may correspond to V$_{ref}$(+)/(−) in the waveforms of FIG. 5B, and V$_{ref2}$(+)/(−) may correspond to V$_{ref}$(−)/(+) in the waveforms of FIG. 5B. Thus, the upper LSB sampler circuit 720 has a zero-crossing when (V$_{in}$(+)−V$_{in}$(−))=−(V$_{ref1}$(+)−V$_{ref1}$(−)), and the lower LSB sampler circuit 730 has a zero-crossing when (V$_{in}$(+)−V$_{in}$(−))=−(V$_{ref2}$(+)−V$_{ref2}$(−)).

The differential LSB extractor circuit 700 of FIG. 7 differs from the differential LSB extractor circuit 600 of FIG. 6 in that the differential reference voltage signals (i.e., V$_{ref1}$ and V$_{ref2}$) are applied to the zero-crossing detectors, instead of through a pre-amplifier. Thus, the differential LSB extractor circuit 700 of FIG. 7 has potential advantages in terms of both DC power and complexity.

At this point it should be noted that the differential reference voltage signals (i.e., V$_{ref1}$ and V$_{ref2}$) in FIGS. 6 and 7 may alternatively be replaced with time-varying equalization signals (i.e., V$_{eq1}$ and V$_{eq2}$) that are data-dependent and are used to compensate bandwidth limitations and channel impedance discontinuities, as described in more detail in FIGS. 15B and 15C below.

Referring to FIG. 8A, there is shown an embodiment of a portion of a differential LSB extractor circuit 800 in accordance with the present invention. The differential LSB extractor circuit portion 800 comprises a pair of input transistors 802, a pair of resistive loads 804, and a current source 806, which are all arranged to be used when extracting the LSB value from a differential 4-PAM input signal (i.e., $V_{in}(+)$ and $V_{in}(-)$). More specifically, the differential LSB extractor circuit portion 800 receives the differential 4-PAM input signal (i.e., $V_{in}(+)$ and $V_{in}(-)$) at the pair of input transistors 802, which regulates current through the pair of resistive loads 804 and the current source 806.

The pair of input transistors 802 are not balanced, as depicted by the multipliers ×M and ×1 shown adjacent each of the pair of input transistors 802. This unbalance in the pair of input transistors 802 results in a shift in the transfer function of the differential LSB extractor circuit portion 800, as shown in FIG. 8B. Thus, the differential LSB extractor circuit portion 800 operates as an integrated preamplifier and offset creator for use in upper and/or lower LSB sampler circuits in accordance with the present invention.

Figure 9:
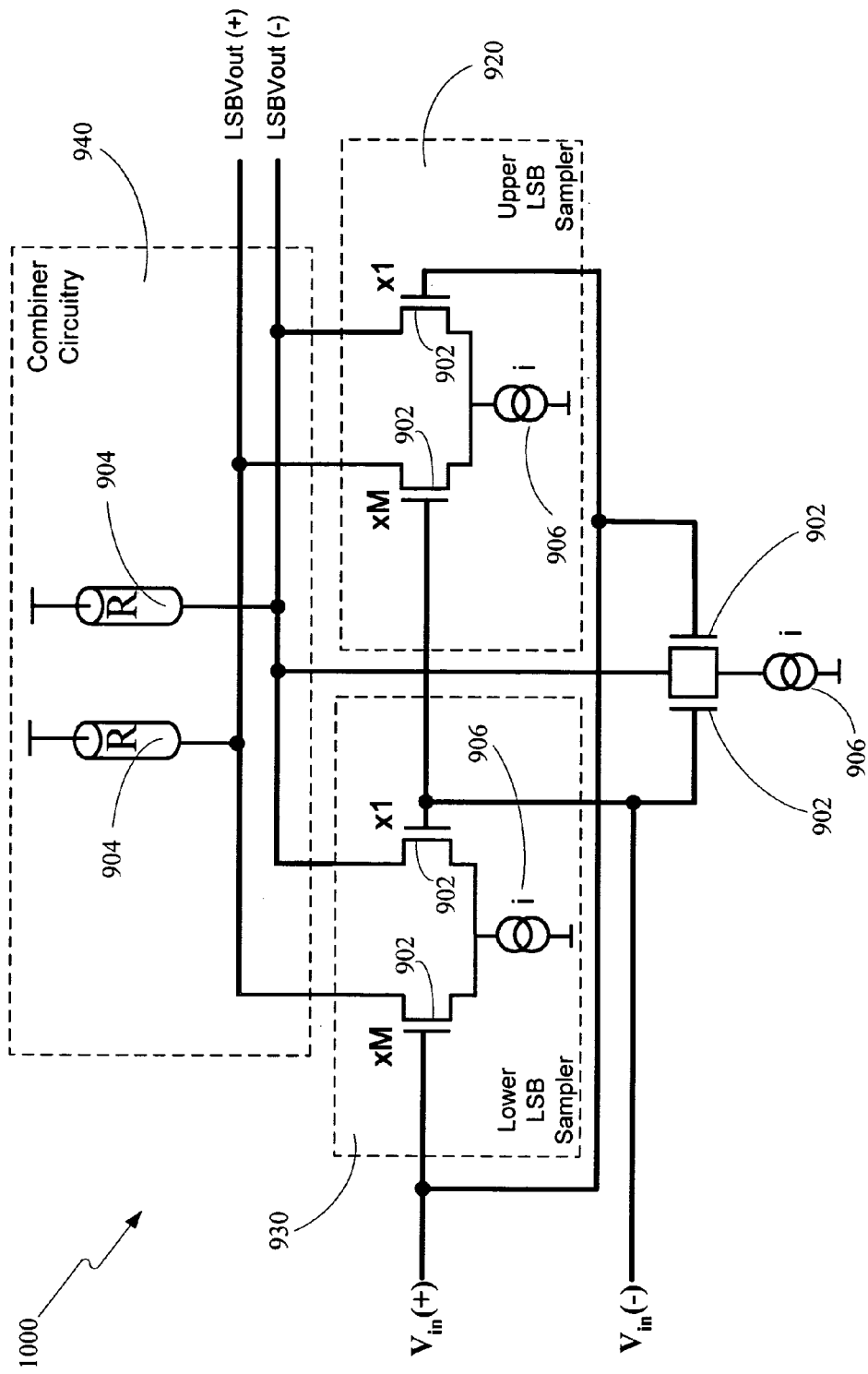
FIG. 9 shows another alternate embodiment of a differential LSB extractor circuit in accordance with the present invention.

Referring to FIG. 9, there is shown another alternate embodiment of a differential LSB extractor circuit 900 in accordance with the present invention. The differential LSB extractor circuit 900, which utilizes the concept described above with respect to the differential LSB extractor circuit portion 800 shown in FIG. 8A, comprises a plurality of transistors 902, a pair of resistive loads 904, and a plurality of current sources 906, which are all arranged to extract the LSB value from a differential 4-PAM input signal (i.e., $V_{in}(+)$ and $V_{in}(-)$). More specifically, the differential LSB extractor circuit 900 receives the differential 4-PAM input signal (i.e., $V_{in}(+)$ and $V_{in}(-)$) at complementary unbalanced input transistor pairs, which regulate current through the pair of resistive loads 904 and respective ones of the plurality of current sources 906. The differential 4-PAM input signal (i.e., $V_{in}(+)$ and $V_{in}(-)$) is also applied to a balanced input transistor pair, which is coupled to and regulates current through one of the resistive loads 904 and another of the plurality of current sources 906. A differential output signal (i.e., $LSBV_{out}(+)$ and $LSBV_{out}(-)$) indicates the LSB value of the differential 4-PAM input signal (i.e., $V_{in}(+)$ and $V_{in}(-)$).

Figure 10B:
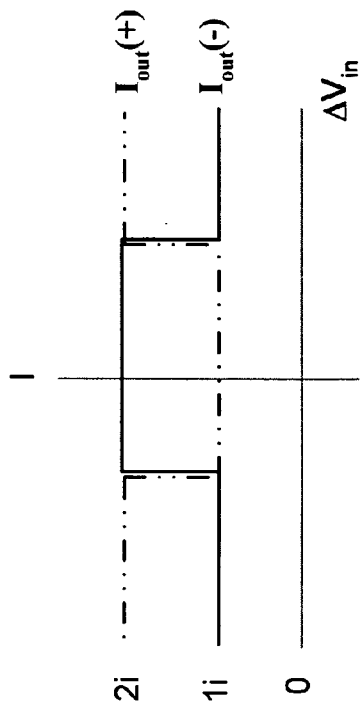
FIG. 10B shows waveforms for when the differential LSB extractor circuit of FIG. 9 includes a balanced input transistor pair.
Figure 10A:
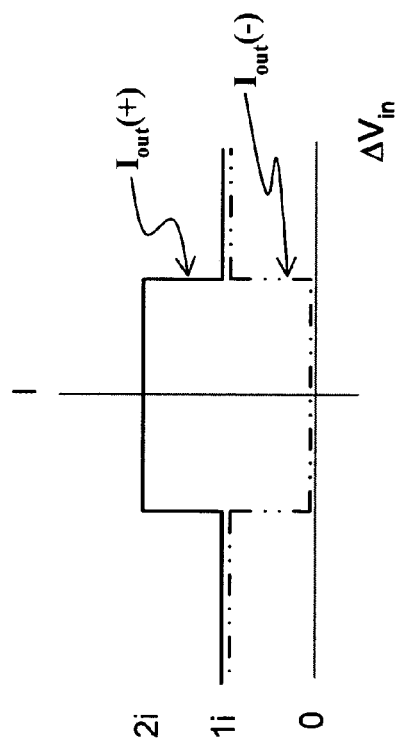
FIG. 10A shows waveforms for when the differential LSB extractor circuit of FIG. 9 does not include a balanced input transistor pair.

The differential LSB extractor circuit 900, which comprises an upper LSB sampler circuit 920, a lower LSB sampler circuit 930, and combiner circuitry 940, as indicated by the dashed line boxes in FIG. 9, allows for the extraction of the LSB value of the differential 4-PAM input signal (i.e., $V_{in}(+)$ and $V_{in}(-)$) in a differential fashion in a single stage. This has advantages in terms of area and power compared to the two-sampler design of FIG. 6. The complementary unbalanced input transistor pairs are "pre-tilted" in opposite directions and then recombined, as shown in the waveforms of FIGS. 10A and 10B. FIG. 10A comprises waveforms for when the differential LSB extractor circuit 900 does not include, and thus for when the differential 4-PAM input signal (i.e., $V_{in}(+)$ and $V_{in}(-)$) is not applied to, the balanced input transistor pairs 902. FIG. 10B comprises waveforms for when the differential LSB extractor circuit 900 includes, and for when the differential 4-PAM input signal (i.e., $V_{in}(+)$ and $V_{in}(-)$) is applied to, the balanced input transistor pairs 902. As shown in FIGS. 10A and 10B, the addition of the balanced input transistor pair allows for a shifting of the $I_{out}(-)$ waveform to match the common-mode of the $I_{out}(+)$ waveform, and the application of the differential 4-PAM input signal (i.e., $V_{in}(+)$ and $V_{in}(-)$) to all of the plurality of transistors 902 allows for good matching of output currents in the current sources 1006 since their output conductance as a function of voltage is now matched.

Figure 11:
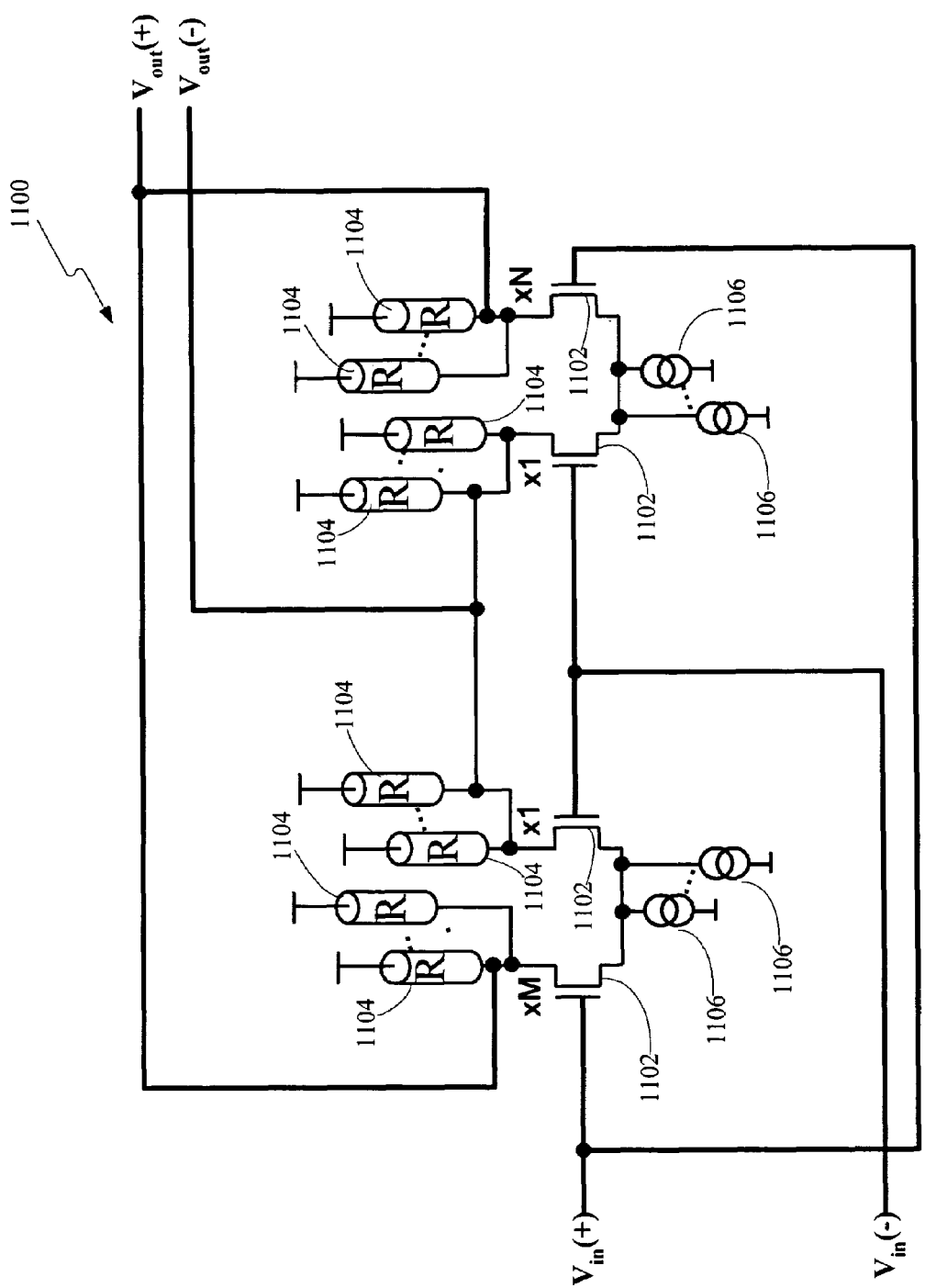
FIG. 11 shows an alternate embodiment of a portion of a differential LSB extractor circuit in accordance with the present invention.

Referring to FIG. 11, there is shown an alternate embodiment of a portion of a differential LSB extractor circuit 1200 in accordance with the present invention. The differential LSB extractor circuit portion 1100 comprises a plurality of transistors 1102, a plurality of resistive loads 1104, and a plurality of current sources 1106, which are all arranged to be used when extracting the LSB value from a differential 4-PAM input signal (i.e., $V_{in}(+)$ and $V_{in}(-)$). More specifically, the differential LSB extractor circuit 1100 receives the differential 4-PAM input signal (i.e., $V_{in}(+)$ and $V_{in}(-)$) at complementary unbalanced input transistor pairs, which regulate current through respective ones of the plurality of resistive loads 1104 and respective ones of the plurality of current sources 1106. A differential output signal (i.e., $V_{out}(+)$ and $V_{out}(-)$) is generated and then used when extracting the LSB value of the differential 4-PAM input signal (i.e., $V_{in}(+)$ and $V_{in}(-)$).

The complementary unbalanced input transistor pairs in FIG. 11 have different levels of balance as depicted by the multipliers ×M and ×N shown adjacent to respective transistors in each complementary unbalanced input transistor pair. Also, the differential LSB extractor circuit portion 1100 is adjustable. That is, the values of the plurality of resistive loads 1104 may be adjusted and the values of the plurality of current sources 1106 may be adjusted. Thus, by simultaneously adjusting the values of the plurality of current sources 1106 and the values of the plurality of resistive loads 1104, a constant swing may be maintained at different current levels, and thus at different $g_m$ levels. When outputs from each complementary unbalanced input transistor pair are combined, a single differential output signal (i.e., $V_{out}(+)$ and $V_{out}(-)$) with a desired offset is created.

Figure 12:
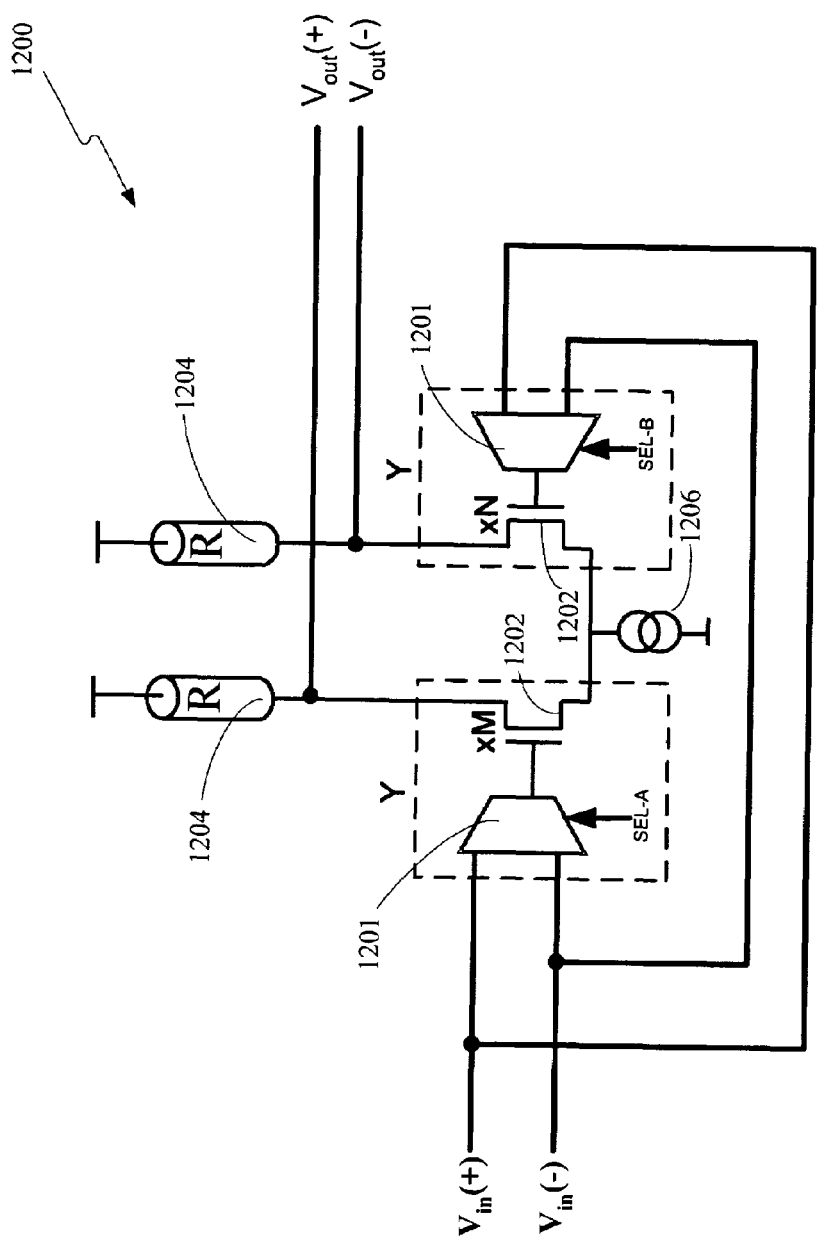
FIG. 12 shows another alternate embodiment of a portion of a differential LSB extractor circuit in accordance with the present invention.

Referring to FIG. 12, there is shown another alternate embodiment of a portion of a differential LSB extractor circuit 1200 in accordance with the present invention. The differential LSB extractor circuit portion 1200 comprises a plurality (i.e., 2Y) of multiplexers 1201, a plurality (i.e., 2Y) of transistors 1202, a pair of resistive loads 1204, and a current source 1206, which are all arranged to be used when extracting the LSB value from a differential 4-PAM input signal (i.e., $V_{in}(+)$ and $V_{in}(-)$). More specifically, the differential LSB extractor circuit 1200 receives the differential 4-PAM input signal (i.e., $V_{in}(+)$ and $V_{in}(-)$) at each of the plurality of multiplexers 1201, which are controlled through select signals (i.e., SEL-A and SEL-B) to select which portion of the differential 4-PAM input signal (i.e., $V_{in}(+)$ and $V_{in}(-)$) will be applied to respective complementary unbalanced input transistor pairs. The complementary unbalanced input transistor pairs regulate current through the pair of resistive loads 1204 and the current source 1206. A differential output signal (i.e., $V_{out}(+)$ and $V_{out}(-)$) is generated and then used when extracting the LSB value of the differential 4-PAM input signal (i.e., $V_{in}(+)$ and $V_{in}(-)$).

The complementary unbalanced input transistor pairs in FIG. 12 have different levels of balance as depicted by the multipliers ×M and ×N shown adjacent the transistors in the complementary unbalanced input transistor pair shown. Also, the differential LSB extractor circuit portion 1200 is adjustable. That is, the plurality of multiplexers 1201 may be controlled through select signals (i.e., SEL-A and SEL-B) to select which portion of the differential 4-PAM input signal (i.e., $V_{in}(+)$ and $V_{in}(-)$) will be applied to respective complementary unbalanced input transistor pairs. By switching or removing inputs via the plurality of multiplexers 1201, both gain and offset may be adjusted.

Figure 13:
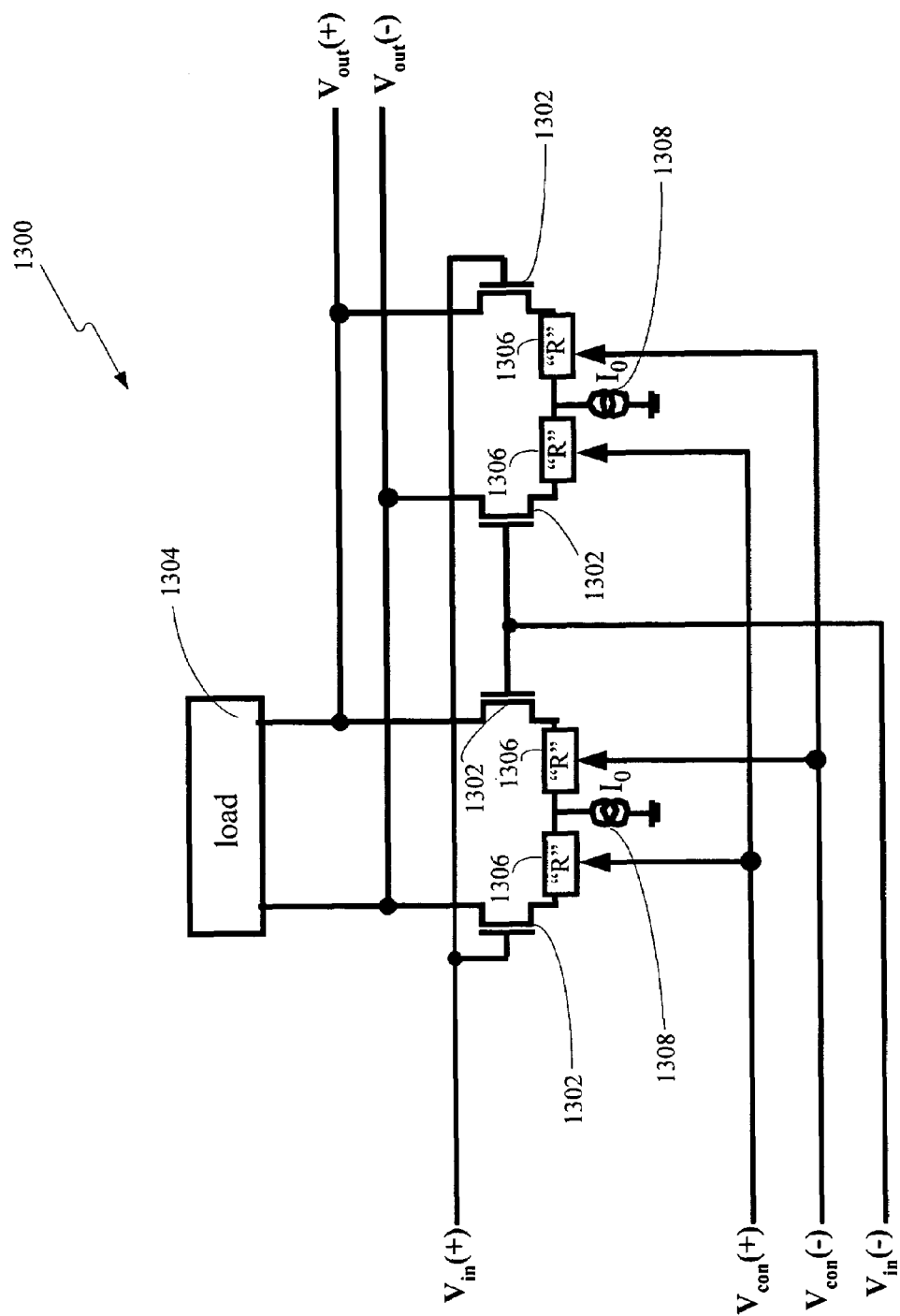
FIG. 13 shows another alternate embodiment of a portion of a differential LSB extractor circuit in accordance with the present invention.

Referring to FIG. 13, there is shown another alternate embodiment of a portion of a differential LSB extractor circuit 1300 in accordance with the present invention. The differential LSB extractor circuit portion 1300 comprises a plurality of transistors 1302, a load 1304, a plurality of adjustable degeneration resistance elements 1306, and a pair of current sources 1308, which are all arranged to be used when extracting the LSB value from a differential 4-PAM input signal (i.e., $V_{in}(+)$ and $V_{in}(-)$). More specifically, the differential LSB extractor circuit portion 1300 receives the differential 4-PAM input signal (i.e., $V_{in}(+)$ and $V_{in}(-)$) at complementary input transistor pairs, which regulate current through the load 1304 and respective ones of the pair of current sources 1308. A pair of, possibly differential, control voltage signals (i.e., $V_{con}(+)$ and $V_{con}(-)$) are applied to the plurality of adjustable degeneration resistance elements 1306, which are coupled between respective transistors of the complementary input transistor pairs and respective ones of the pair of current sources 1308. A differential output signal (i.e., $V_{out}(+)$ and $V_{out}(-)$) is generated and then used when extracting the LSB value of the differential 4-PAM input signal (i.e., $V_{in}(+)$ and $V_{in}(-)$).

The differential LSB extractor circuit 1300 is adjustable. That is, the control voltage signals (i.e., $V_{con}(+)$ and $V_{con}(-)$) are applied to the plurality of adjustable degeneration resistance elements 1306 so as to adjust the resistance value of the plurality of adjustable degeneration resistance elements 1306. Values for the control voltage signals (i.e., $V_{con}(+)$ and $V_{con}(-)$) to achieve a desired LSB sampling may be determined in a calibration scheme monitoring expected outputs versus values of the control voltage signals (i.e., $V_{con}(+)$ and $V_{con}(-)$) over a continuous range, with the values for the control voltage signals (i.e., $V_{con}(+)$ and $V_{con}(-)$) being set where there is a greatest margin from erroneous outputs. The resistance value of the plurality of adjustable degeneration resistance elements 1306 may be adjusted to realize a voltage difference across each coupled pair of adjustable degeneration resistance elements 1306, as well as improve transistor pair matching. For example, the plurality of adjustable degeneration resistance elements 1306 may be realized as field effect transistors (FETs) whose gates are controlled by the control voltage signals (i.e., $V_{con}(+)$ and $V_{con}(-)$). This technique may also be used in a sense amplifier, where switches replace current sources.

Figure 14A:
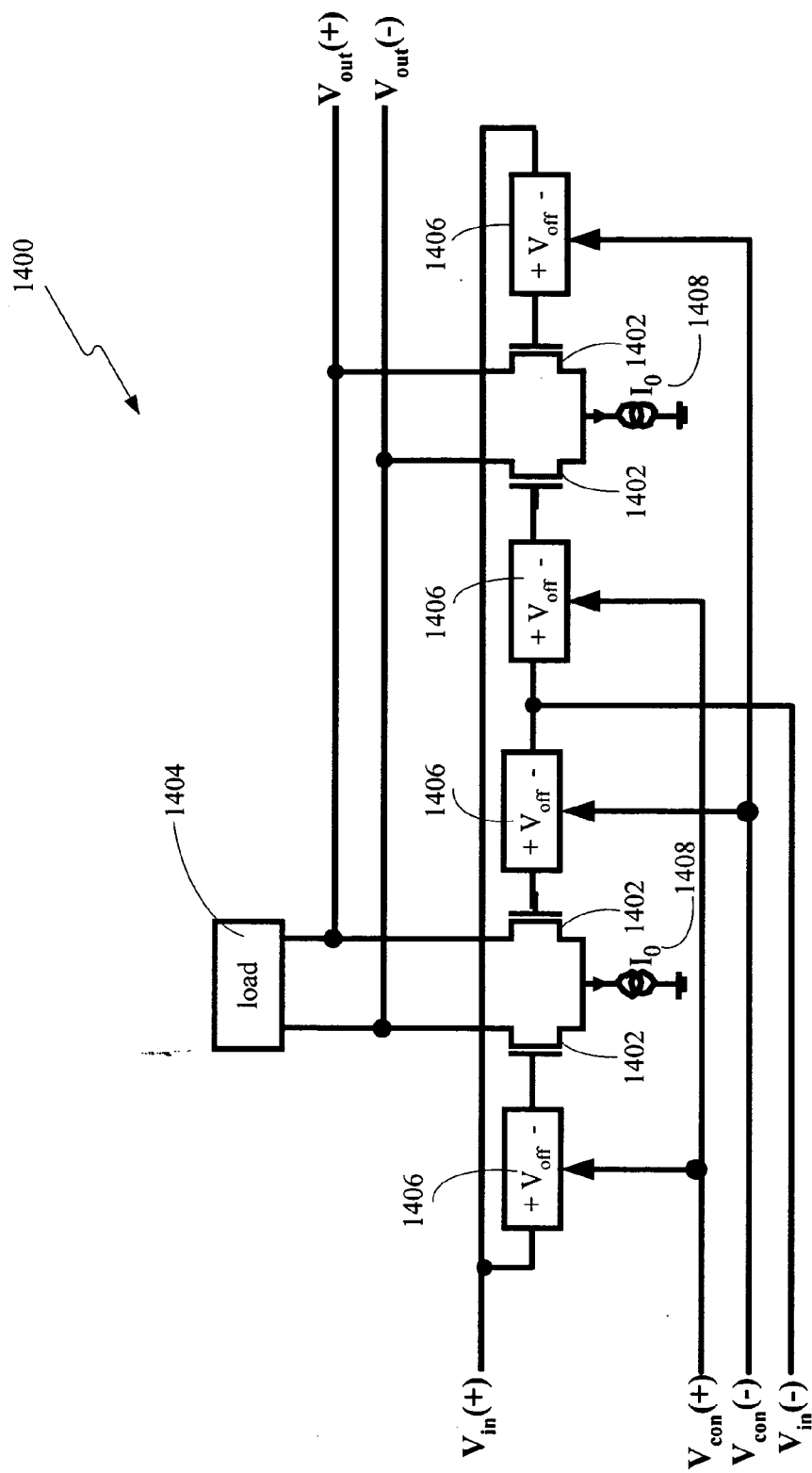
FIG. 14A shows another alternate embodiment of a portion of a differential LSB extractor circuit in accordance with the present invention.

Referring to FIG. 14A, there is shown another alternate embodiment of a portion of a differential LSB extractor circuit 1400 in accordance with the present invention. The differential LSB extractor circuit portion 1400 comprises a plurality of transistors 1402, a load 1404, a plurality of adjustable offset voltage sources 1406, and a pair of current sources 1408, which are all arranged to be used when extracting the LSB value from a differential 4-PAM input signal (i.e., $V_{in}(+)$ and $V_{in}(-)$). More specifically, the differential LSB extractor circuit 1400 receives the differential 4-PAM input signal (i.e., $V_{in}(+)$ and $V_{in}(-)$) at the plurality of adjustable offset voltage sources 1406, which are controlled by a pair of, possibly differential, control voltage signals (i.e., $V_{con}(+)$ and $V_{con}(-)$). That is, the control voltage signals (i.e., $V_{con}(+)$ and $V_{con}(-)$) are applied to the plurality of adjustable offset voltage sources 1406 so as to adjust the input voltage applied to complementary input transistor pairs, which regulate current through the load 1404 and respective ones of the pair of current sources 1408. A differential output signal (i.e., $V_{out}(+)$ and $V_{out}(-)$) is generated and then used when extracting the LSB value of the differential 4-PAM input signal (i.e., $V_{in}(+)$ and $V_{in}(-)$).

Figure 14B:
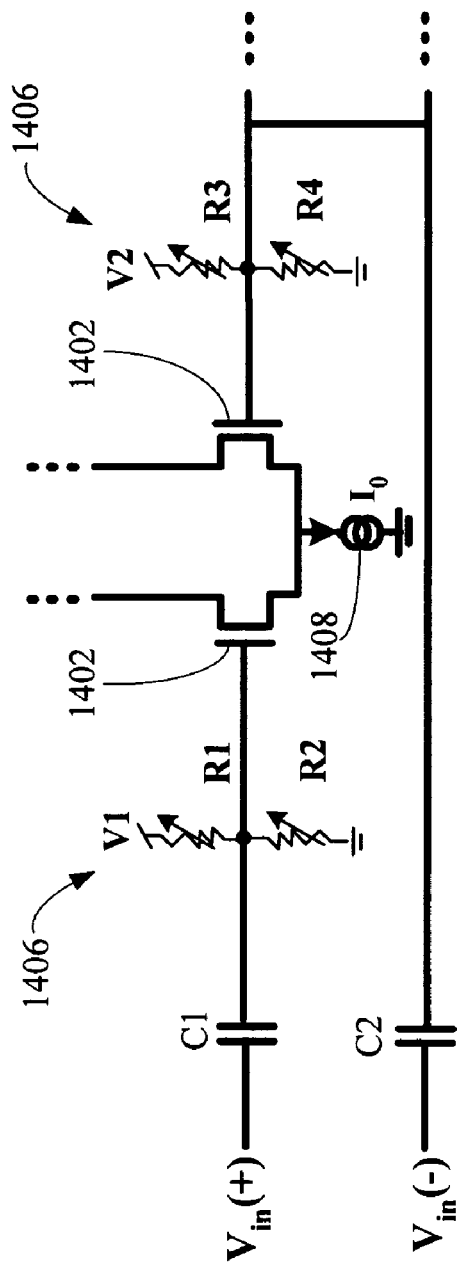
FIG. 14B shows an implementation of the adjustable offset voltage sources shown in FIG. 14A in an AC-coupled system in accordance with the present invention.

The differential LSB extractor circuit portion 1400 is adjustable. That is, the control voltage signals (i.e., $V_{con}(+)$ and $V_{con}(-)$) are applied to the plurality of adjustable offset voltage sources 1406 so as to adjust the offset voltage value of the plurality of adjustable offset voltage sources 1406. Values for the control voltage signals (i.e., $V_{con}(+)$ and $V_{con}(-)$) to achieve a desired LSB sampling may be determined in a calibration scheme monitoring expected outputs versus values for the control voltage signals (i.e., $V_{con}(+)$ and $V_{con}(-)$) over a continuous range, with the values for the control voltage signals (i.e., $V_{con}(+)$ and $V_{con}(-)$) being set where there is a greatest margin from erroneous outputs. The offset voltage value of the plurality of adjustable offset voltage sources 1406 may be adjusted so as to adjust the input voltage applied to complementary input transistor pairs. The plurality of adjustable offset voltage sources 1406 are coupled to the complementary input transistor pairs along the signal paths of the differential 4-PAM input signal (i.e., $V_{in}(+)$ and $V_{in}(-)$). The plurality of adjustable offset voltage sources 1406 may be implemented in an AC-coupled system, for example, as resistor dividers whose resistances or voltages are adjustable, as shown in FIG. 14B. This technique may also be used in a sense amplifier, where switches replace current sources.

Figure 15A:
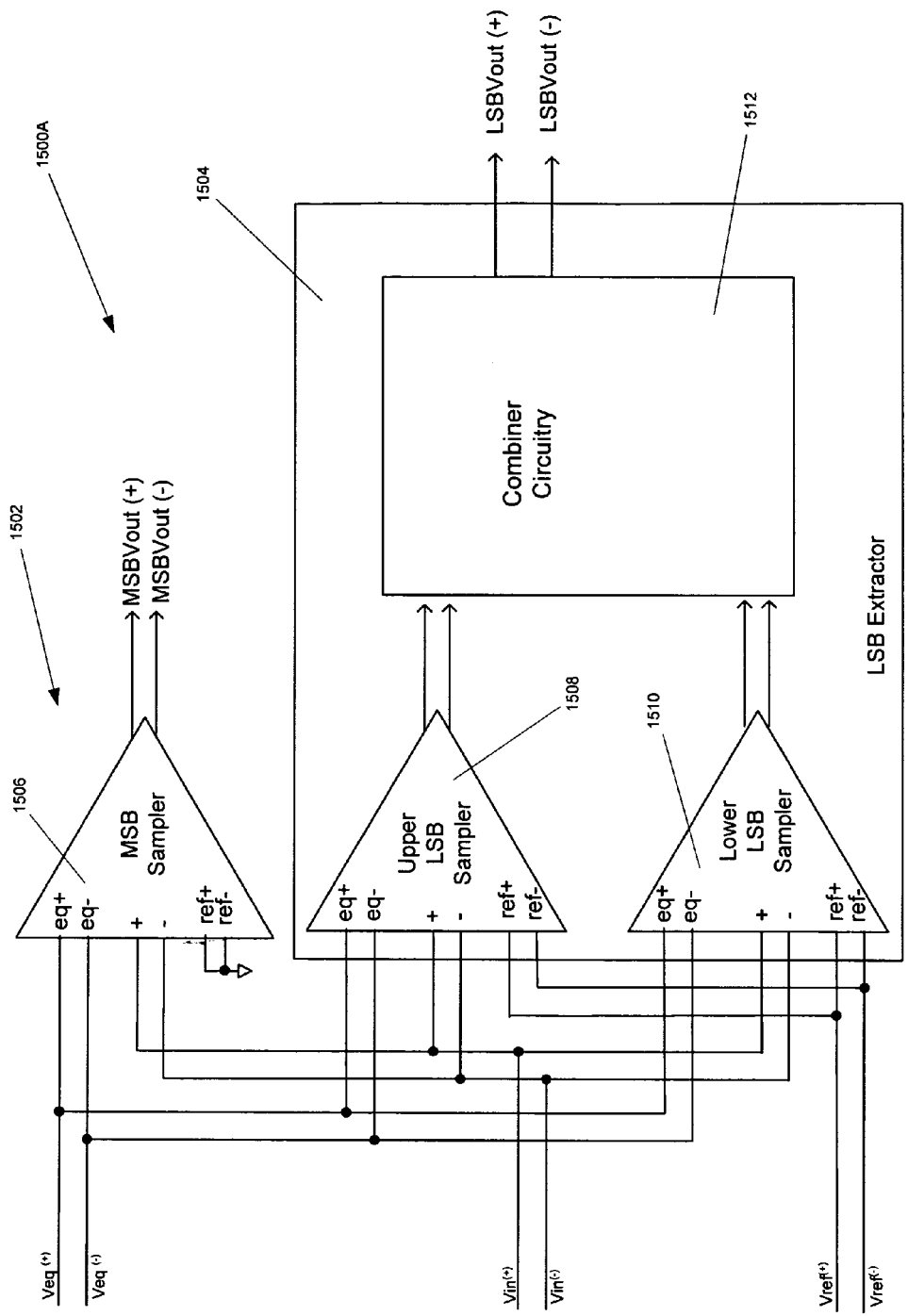
FIG. 15A shows an alternate embodiment of a differential LSB and MSB extractor circuit for use in a differential 4-PAM signaling system in accordance with an embodiment of the present invention.

Referring to FIG. 15A, there is shown an alternate embodiment of a differential LSB and MSB extractor circuit 1500 for use in a differential 4-PAM signaling system in accordance with an embodiment of the present invention. The extractor circuit 1500 comprises MSB extractor circuitry 1502 and LSB extractor circuitry 1504. The MSB extractor circuitry 1502 comprises an MSB sampler circuit 1506, which receives a differential 4-PAM input signal (i.e., $V_{in}(+)$ and $V_{in}(-)$), a differential equalization signal (i.e., $V_{eq}(+)$ and $V_{eq}(-)$), and a reference voltage (i.e., ground), and generates a differential output signal (i.e., $MSBV_{out}(+)$ and $MSBV_{out}(-)$) indicating the MSB value of the differential 4-PAM input signal (i.e., $V_{in}(+)$ and $V_{in}(-)$).

The LSB extractor circuitry 1504 comprises an upper LSB sampler circuit 1508, a lower LSB sampler circuit 1510, and combiner circuitry 1512. The upper LSB sampler circuit 1508 receives the differential 4-PAM input signal (i.e., $V_{in}(+)$ and $V_{in}(-)$), the differential equalization signal (i.e., $V_{eq}(+)$ and $V_{eq}(-)$), and a differential reference voltage (i.e., $V_{ref}(+)$ and $V_{ref}(-)$), and generates a differential output signal for use by the combiner circuitry 1512. Similarly, the lower LSB sampler circuit 1510 receives the differential 4-PAM input signal (i.e., $V_{in}(+)$ and $V_{in}(-)$), the differential equalization signal (i.e., $V_{eq}(+)$ and $V_{eq}(-)$), and the differential reference voltage (i.e., $V_{ref}(+)$ and $V_{ref}(-)$), and generates a differential output signal for use by the combiner circuitry 1512. The combiner circuitry 1512, which functionally operates to logically "exclusively OR" ("XOR") the differential signals received from the upper LSB sampler circuit 1508 and the lower LSB sampler circuit 1510, generates a differential output signal (i.e., $LSBV_{out}(+)$ and $LSBV_{out}(-)$) indicating the LSB value of the differential 4-PAM input signal (i.e., $V_{in}(+)$ and $V_{in}(-)$).

Figures 15B, 15C:
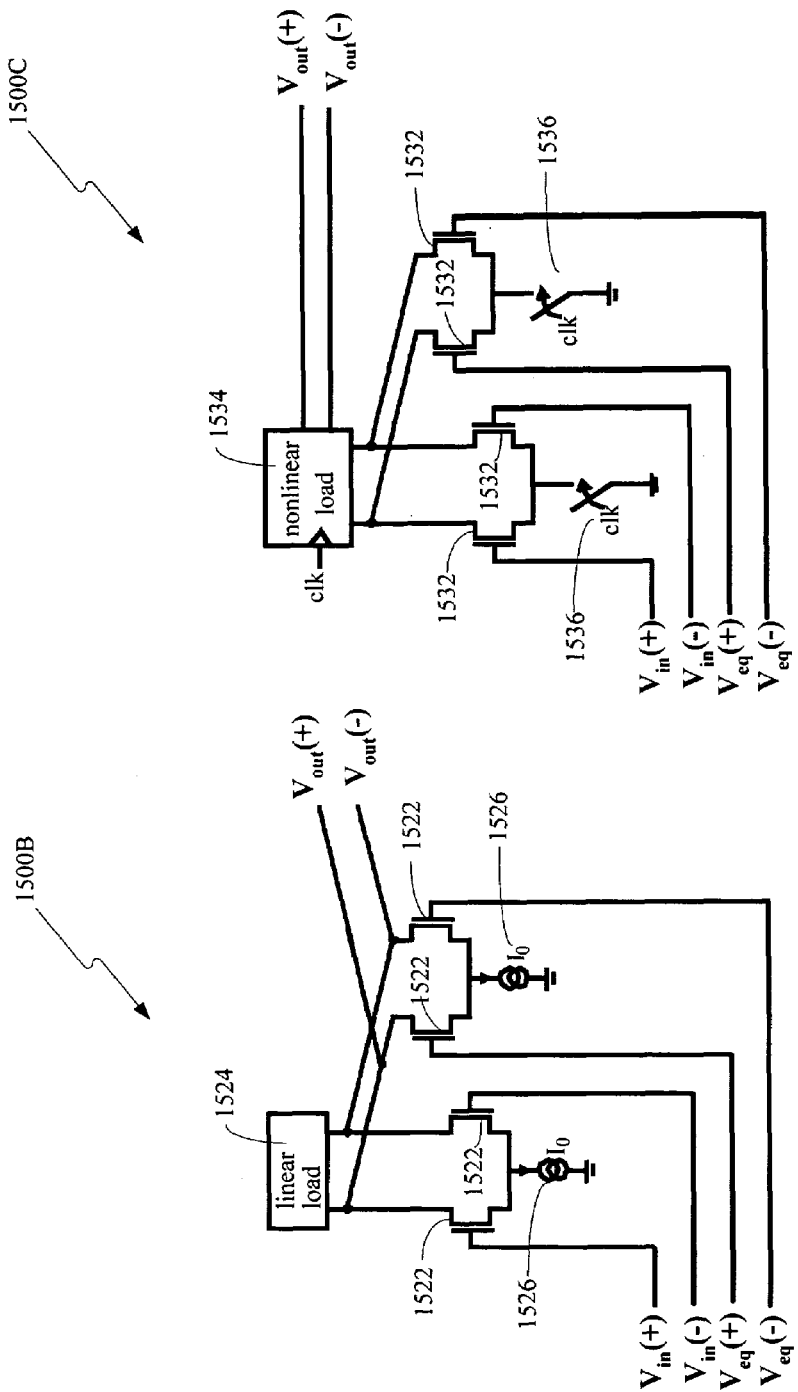
FIG. 15B shows an alternate embodiment of a portion of a differential LSB extractor circuit in accordance with the present invention.
FIG. 15C shows another alternate embodiment of a portion of a differential LSB extractor circuit in accordance with the present invention.

Referring to FIG. 15B, there is shown an alternate embodiment of a portion of a differential LSB extractor circuit 1500B in accordance with the present invention. The differential LSB extractor circuit portion 1500B comprises a plurality of transistors 1522, a linear load 1524, and a pair of current sources 1526, which are all arranged to be used when extracting the LSB value from a differential 4-PAM input signal (i.e., $V_{in}(+)$ and $V_{in}(-)$). More specifically, the differential LSB extractor circuit portion 1500B receives the differential 4-PAM input signal (i.e., $V_{in}(+)$ and $V_{in}(-)$) at an input transistor pair, which regulates current through the linear load 1524 and one of the current sources 1526. A differential equalization voltage signal (i.e., $V_{eq}(+)$ and $V_{eq}(-)$) is applied to another transistor pair, which is coupled to the input transistor pair and regulates current through the linear load 1524 and another one of the current sources 1526. A differential output voltage signal (i.e., $V_{out}(+)$ and $V_{out}(-)$) is provided by the transistor pair grouping.

The differential LSB extractor circuit portion 1500B of FIG. 15B may be utilized to apply a differential equalization voltage signal (i.e., $V_{eq}(+)$ and $V_{eq}(-)$) to a transistor pair in the differential LSB extractor circuit 1500 of FIG. 15A when in a preamp configuration. Of course, the differential LSB extractor circuit portion 1500B of FIG. 15B may also be utilized in a differential MSB extractor circuit.

Referring to FIG. 15C, there is shown another alternate embodiment of a portion of a differential LSB extractor circuit 1500C in accordance with the present invention. The differential LSB extractor circuit portion 1500C comprises a plurality of transistors 1532, a differential clocked nonlinear load 1534, and a pair of clocked switches 1536, which are all arranged to be used when extracting the LSB value from a differential 4-PAM input signal (i.e., $V_{in}(+)$ and $V_{in}(-)$). More specifically, the differential LSB extractor circuit portion 1500C receives the differential 4-PAM input signal (i.e., $V_{in}(+)$ and $V_{in}(-)$) at an input transistor pair, which regulates current through the differential clocked nonlinear load 1534 and one of the clocked switches 1536. A differential equalization voltage signal (i.e., $V_{eq}(+)$ and $V_{eq}(-)$) is applied to another transistor pair, which is coupled to the input transistor pair and regulates current through the differential clocked nonlinear load 1534 and another one of the clocked switches 1536. A differential output voltage signal (i.e., $V_{out}(+)$ and $V_{out}(-)$) is provided by the differential clocked nonlinear load 1534.

The differential LSB extractor circuit portion 1500C of FIG. 15C may be utilized to apply a differential equalization voltage signal (i.e., $V_{eq}(+)$ and $V_{eq}(-)$) to a transistor pair in the differential LSB extractor circuit 1500 of FIG. 15A when in a non-preamp configuration. Of course, the differential LSB extractor circuit portion 1500C of FIG. 15C may also be utilized in a differential MSB extractor circuit.

Figure 16B:
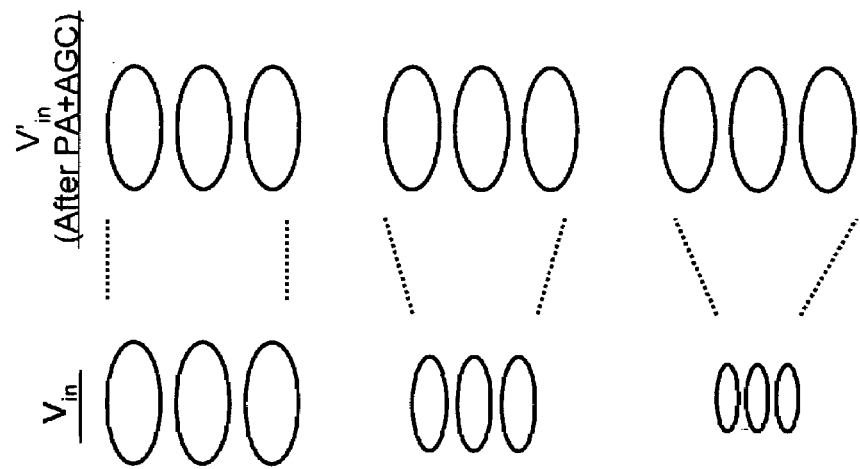
FIG. 16B shows eye diagrams for a differential input signal before and after processing by a preamplifier circuit and an automatic gain control circuit in the differential preamplifier and automatic gain control circuit of FIG. 16A.
Figure 16A:
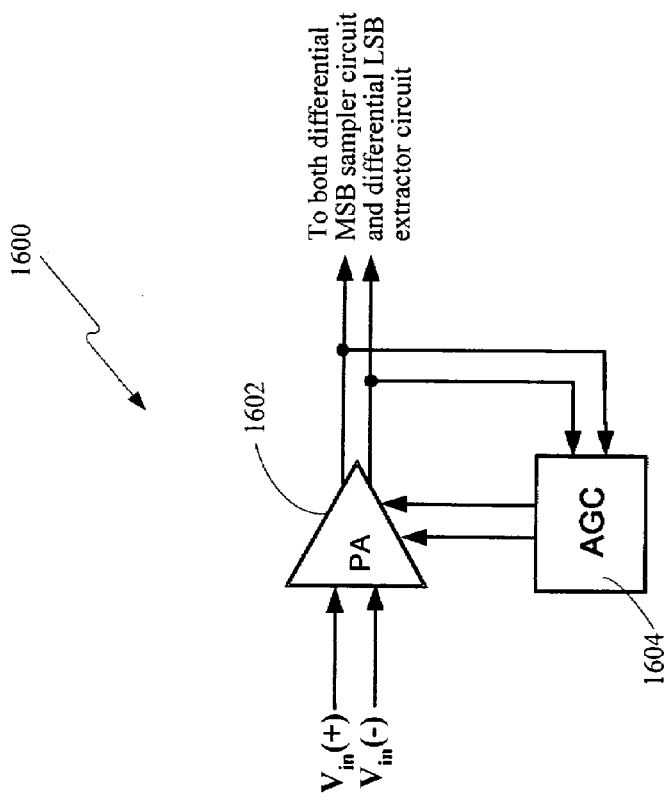
FIG. 16A shows an embodiment of a differential preamplifier and automatic gain control circuit for use with a differential LSB and MSB extractor circuit in a differential 4-PAM signaling system in accordance with the present invention.

Referring to FIG. 16A, there is shown an embodiment of a differential preamplifier and automatic gain control circuit 1600 for use with a differential LSB and MSB extractor circuit in a differential 4-PAM signaling system in accordance with the present invention. The differential preamplifier and automatic gain control circuit 1600 comprises a differential preamplifier (PA) circuit 1602 and a differential automatic gain control (AGC) circuit 1604. The differential preamplifier and automatic gain control circuit 1600 is configured such that the differential preamplifier (PA) circuit 1602 and the differential automatic gain control (AGC) circuit 1604 may drive both a differential MSB sampler circuit (see FIGS. 5A and 15A) and a differential LSB extractor circuit (see FIGS. 5A and 15A). The use of the differential automatic gain control (AGC) circuit 1604 allows the differential MSB sampler circuit and the differential LSB extractor circuit to receive consistent input signal levels despite varying attenuation that may be present in a differential 4-PAM input signal (i.e., $V_{in}(+)$ and $V_{in}(-)$), as shown in FIG. 16B.

Figures 17A, 17B:
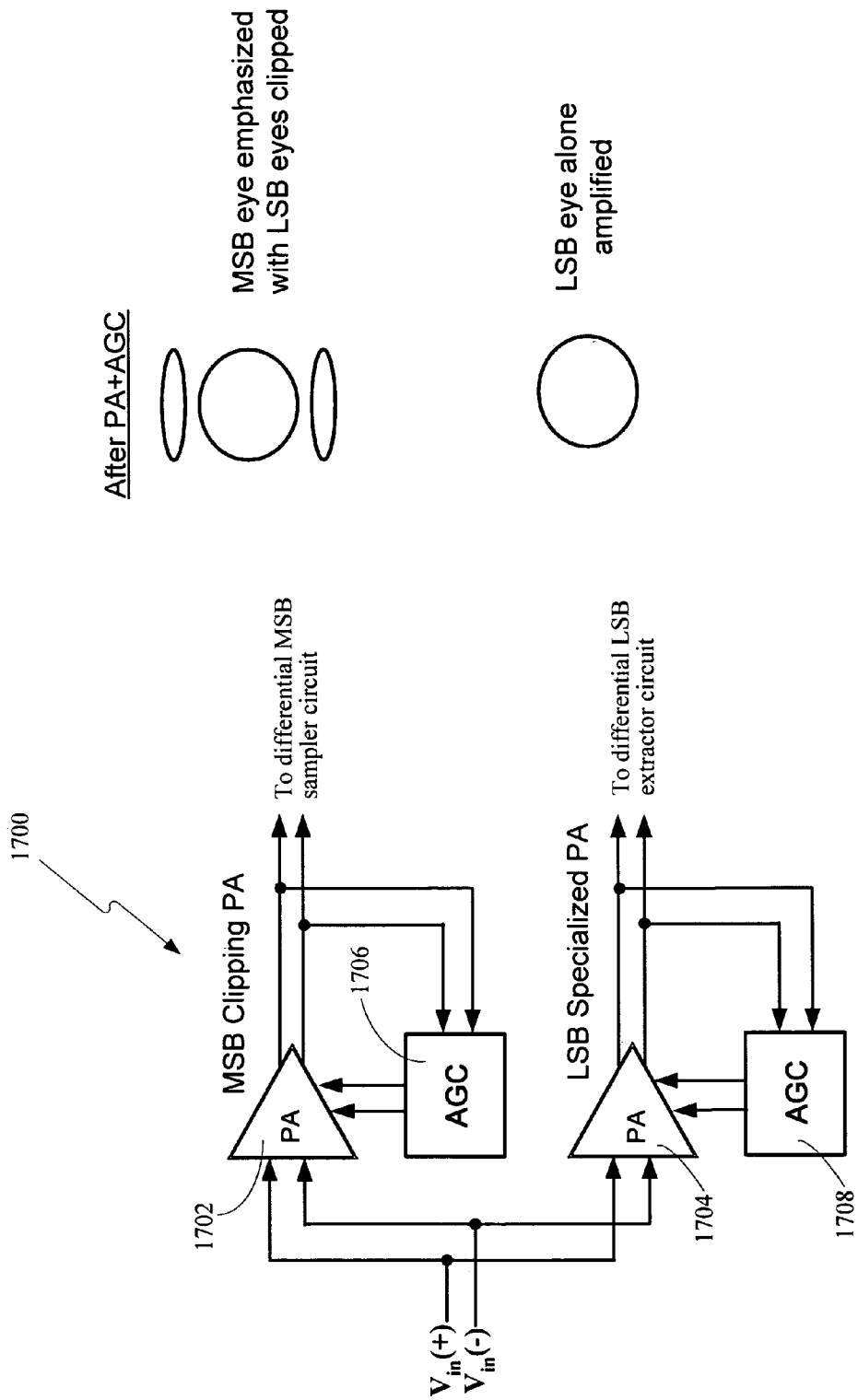
FIG. 17A shows an alternate embodiment of a differential preamplifier and automatic gain control circuit for use with a differential LSB and MSB extractor circuit in a differential 4-PAM signaling system in accordance with the present invention.
FIG. 17B shows eye diagrams for a differential input signal after processing by dedicated preamplifier and automatic gain control circuits in the differential preamplifier and automatic gain control circuit of FIG. 17A.

Referring to FIG. 17A, there is shown an alternate embodiment of a differential preamplifier and automatic gain control circuit 1700 for use with a differential LSB and MSB extractor circuit in a differential 4-PAM signaling system in accordance with the present invention. The differential preamplifier and automatic gain control circuit 1700 comprises a first differential preamplifier (PA) circuit 1702, a second differential preamplifier (PA) circuit 1704, a first differential automatic gain control (AGC) circuit 1706, and a second differential automatic gain control (AGC) circuit 1708. The differential preamplifier and automatic gain control circuit 1700 is configured such that the first differential preamplifier (PA) circuit 1702 and the first differential automatic gain control (AGC) circuit 1706 may drive a differential MSB sampler circuit (see FIGS. 5A and 15A), and the second differential preamplifier (PA) circuit 1704 and the second differential automatic gain control (AGC) circuit 1708 may drive a differential LSB extractor circuit (see FIGS. 5A and 15A). This configuration allows the MSB "eye" of a differential 4-PAM input signal (i.e., $V_{in}(+)$ and $V_{in}(-)$) to be amplified for the differential MSB sampler circuit, while minimizing the effect on the LSB "eye" of the differential 4-PAM input signal (i.e., $V_{in}(+)$ and $V_{in}(-)$), as shown in FIG. 17B. More importantly, this configuration allows the LSB "eye" of a differential 4-PAM input signal (i.e., $V_{in}(+)$ and $V_{in}(-)$) to be amplified for the differential LSB extractor circuit, while eliminating the effect on the MSB "eye" of the differential input signal (i.e., $V_{in}(+)$ and $V_{in}(-)$), as shown in FIG. 17B.

Figure 18:
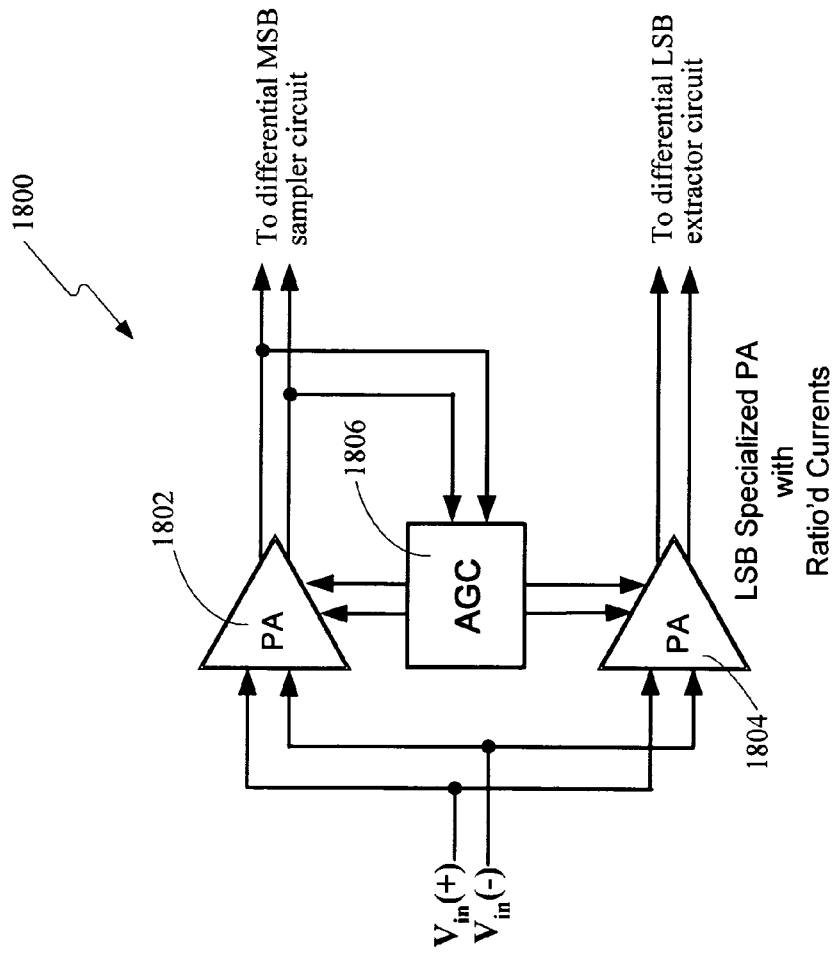
FIG. 18 shows another alternate embodiment of a differential preamplifier and automatic gain control circuit for use with a differential LSB and MSB extractor circuit in a differential 4-PAM signaling system in accordance with the present invention.

Referring to FIG. 18, there is shown another alternate embodiment of a differential preamplifier and automatic gain control circuit 1800 for use with a differential LSB and MSB extractor circuit in a differential 4-PAM signaling system in accordance with the present invention. The differential preamplifier and automatic gain control circuit 1800 comprises a first differential preamplifier (PA) circuit 1802, a second differential preamplifier (PA) circuit 1804, and a differential automatic gain control (AGC) circuit 1806. The differential preamplifier and automatic gain control circuit 1800 is configured such that the differential automatic gain control (AGC) circuit 1806 is used to adjust the output of a differential MSB sampler circuit(see FIGS. 5A and 15A), while it is also used by the second differential preamplifier (PA) circuit 1804 having ratio'd currents so as to allow for a static ratio'd LSB extraction. Because the output of the differential automatic gain control (AGC) circuit 1806 is the same independent of attenuation, the location of LSB "eyes" and thus the required offset in the second differential preamplifier (PA) circuit 1804 may be controlled by a simple fixed current ratio.

At this point it should be noted that the above-described differential LSB extractor circuits and differential preamplifier and automatic gain control circuits may be applied to receive and transmit systems with clock recovery.

Figure 19:
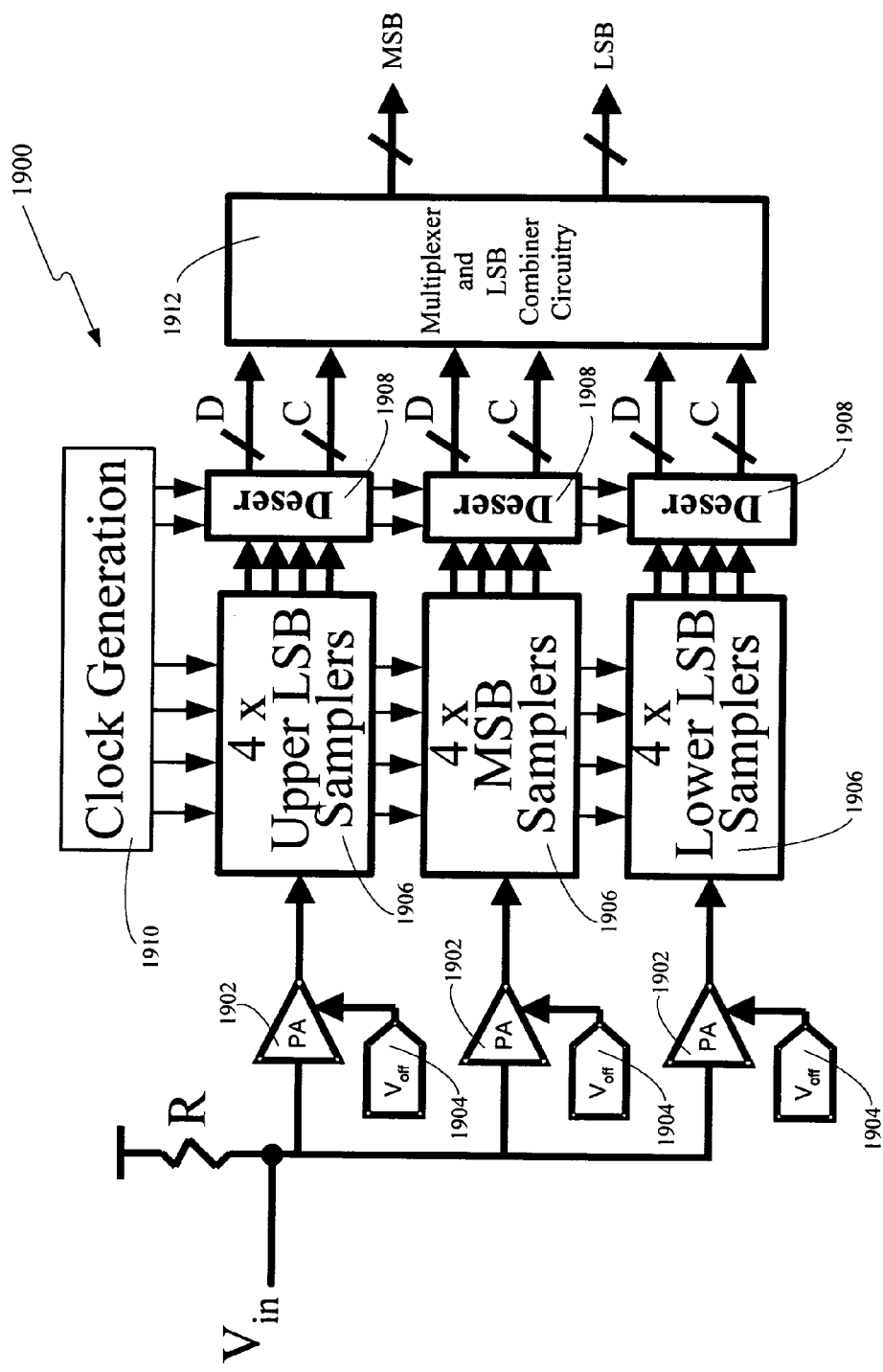
FIG. 19 shows another alternate embodiment of a differential LSB and MSB extractor circuit for use in a differential 4-PAM signaling system in accordance with the present invention.

Referring to FIG. 19, there is shown another alternate embodiment of a differential LSB and MSB extractor circuit 1900 for use in a differential 4-PAM signaling system in accordance with the present invention. The differential LSB and MSB extractor circuit 1900 comprises a plurality of preamplifiers 1902, a plurality of adjustable offset voltage sources 1904, a plurality of clocked multiple-sampler circuits 1906, a plurality of clocked deserializers 1908, clock generation circuitry 1910 for generating clock signals for the plurality of clocked multiple-sampler circuits 1906 and the plurality of clocked deserializers 1908, and multiplexer and LSB combiner circuitry 1912. The differential LSB and MSB extractor circuit 1900 receives a differential 4-PAM input signal (i.e., $V_{in}$), which is then amplified by the plurality of preamplifiers 1902 in conjunction with the plurality of adjustable offset voltage sources 1904. The amplified differential 4-PAM input signals are then sampled by the plurality of clocked multiple-sampler circuits 1906, and then deserialized by the plurality of clocked deserializers 1908. The plurality of clocked deserializers 1908 generates data (D) and clock (C) output signals for an upper LSB sampler path, an MSB sampler path, and a lower LSB sampler path. The multiplexer and LSB combiner circuitry 1912 processes the data (D) and clock (C) output signals and generates parallel data blocks for the LSB and the MSB in the differential 4-PAM input signal (i.e., $V_{in}$).

At this point it should be noted that the clock signals generated for the plurality of clocked multiple-sampler circuits 1906 may be divided by two to generate the data (D) output signals in the plurality of clocked deserializers 1908, and divided by five to generate the clock (C) output signals in the plurality of clocked deserializers 1908. It should also be noted that the plurality of adjustable offset voltage sources 1904 may be implemented using a precision digital-to-analog converter (DAC).

Figure 20:
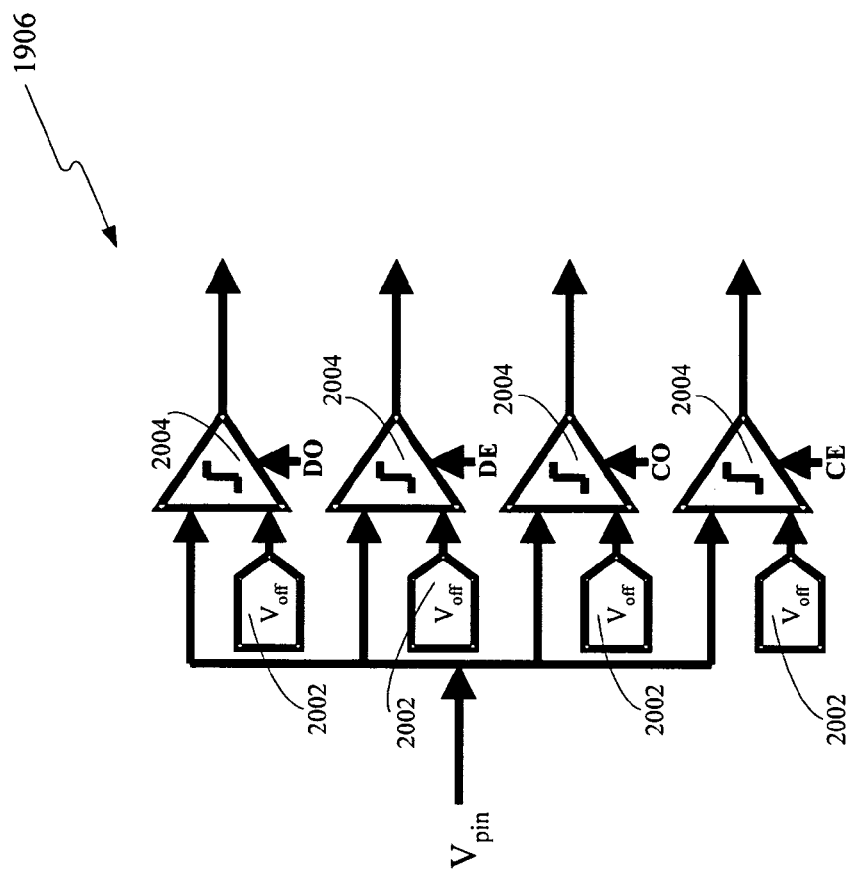
FIG. 20 shows a more detailed schematic diagram of one of the plurality of multiple clocked sampler circuits shown in FIG. 19.

The differential LSB and MSB extractor circuit 1900 may be realized by implementing the plurality of preamplifiers 1902 and the plurality of adjustable offset voltage sources 1904 in accordance with one of the differential preamplifier and automatic gain control circuits described above. Meanwhile, the plurality of clocked multiple-sampler circuits 1906 may be implemented as shown in FIG. 20. More specifically, FIG. 20 shows a more detailed schematic diagram of one of the plurality of clocked multiple-sampler circuits 1906 shown in FIG. 19. As shown in FIG. 20, each of the plurality of clocked multiple-sampler circuits 1906 comprises a plurality of adjustable offset voltage sources 2002 and a plurality of clocked sampler devices 2004. Each of the plurality of clocked sampler devices 2004 receives a preamplified differential 4-PAM input signal (i.e., $V_{pin}$) from a respective one of the plurality of preamplifiers 1902, an offset voltage signal from a respective one of the plurality of adjustable offset voltage sources 2002, and one of a data odd (DO) clock signal, a data even (DE) clock signal, a clock odd (CO) clock signal, or a clock even (CE) clock signal. In response thereto, each of the plurality of clocked sampler devices 2004 generates a sampled output signal, which is deserialized by a respective one of the plurality of clocked deserializers 1908. Similar to the plurality of adjustable offset voltage sources 1904, the plurality of adjustable offset voltage sources 2002 may be implemented using a precision digital-to-analog converter (DAC).

Despite the benefits that are obtained by implementing the plurality of preamplifiers 1902 and the plurality of adjustable offset voltage sources 1904 in accordance with one of the differential preamplifier and automatic gain control circuits described above, the differential LSB and MSB extractor circuit 1900 may still experience problems that require improvement. For example, the plurality of preamplifiers 1902 and the plurality of clocked multiple-sampler circuits 1906 may have uncorrelated random offset error voltages that must be corrected. These uncorrelated random offset error voltages are additive to offset, equalization, or other desired voltages. Because of their presence in each of the plurality of clocked multiple-sampler circuits 1906, these uncorrelated random offset error voltages must be removed on a per sampler basis. Also, these uncorrelated random offset error voltages must be removed periodically because of environmental drift (i.e., temperature variation, power supply variation, long term drift of transistor properties, etc.). Thus, it would be desirable to improve the differential LSB and MSB extractor circuit 1900 so as to eliminate these uncorrelated random offset error voltages.

Figure 21:
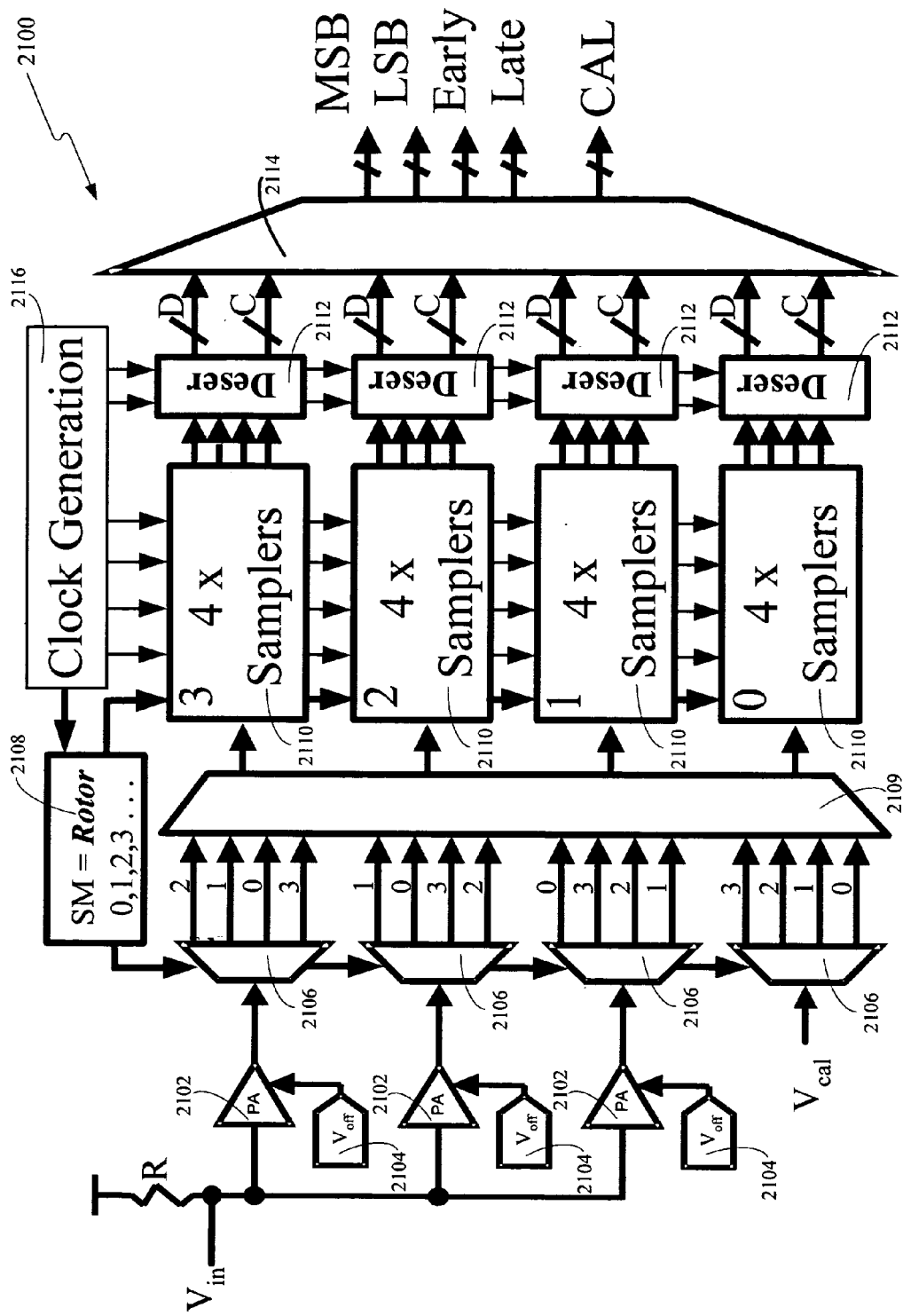
FIG. 21 shows an embodiment of an improved differential LSB and MSB extractor circuit for use in a differential 4-PAM signaling system in accordance with the present invention.

Referring to FIG. 21, there is shown an embodiment of an improved differential LSB and MSB extractor circuit 2100 for use in a differential 4-PAM signaling system in accordance with the present invention. The improved differential LSB and MSB extractor circuit 2100 comprises a plurality of preamplifiers 2102, a plurality of adjustable offset voltage sources 2104, a plurality of analog multiplexers 2106, a clocked state machine 2108, interconnect circuitry 2109, a plurality of clocked multiple-sampler circuits 2110, a plurality of clocked deserializers 2112, a parallel digital multiplexer and LSB combiner circuit 2114, and clock generation circuitry 2116 for generating clock signals for the clocked state machine 2108, the plurality of clocked multiple-sampler circuits 2110, and the plurality of clocked deserializers 2112. The improved differential LSB and MSB extractor circuit 2100 receives a differential 4-PAM input signal (i.e., $V_{in}$) and a differential 4-PAM calibration reference signal (i.e., $V_{cal}$), and generates parallel data blocks for the LSB and the MSB in the differential 4-PAM input signal (i.e., $V_{in}$), as well as parallel data blocks for clock data recovery (CDR) and calibration (CAL) purposes.

In operation, the clocked state machine 2108 functions similar to a rotor by selecting individual outputs in each of the plurality of analog multiplexers 2106 in a sequential order such that three of the plurality of clocked multiple-sampler circuits 2110 are being used, while one of the plurality of clocked multiple-sampler circuits 2110 is being internally calibrated. Thus, redundancy is provided in the plurality of clocked multiple-sampler circuits 2110 (as well as in the plurality of clocked deserializers 2112) so as to allow offset voltage calibration in the plurality of clocked multiple-sampler circuits 2110 and thereby eliminate uncorrelated random offset error voltages.

At this point it should be noted that the clock signals generated for the clocked state machine 2108 and the plurality of clocked multiple-sampler circuits 2110 may be divided by two to generate data (D) output signals in the plurality of clocked deserializers 2112, and divided by five to generate clock (C) output signals in the plurality of clocked deserializers 2112. Thus, the preamplified differential 4-PAM input signals from the plurality of preamplifiers 2102 and the differential 4-PAM calibration reference signal (i.e., $V_{cal}$) are switched through the plurality of analog multiplexers 2106 in a relatively low speed domain. It should also be noted that the plurality of adjustable offset voltage sources 2104 may be implemented using a precision digital-to-analog converter (DAC).

Figure 22:
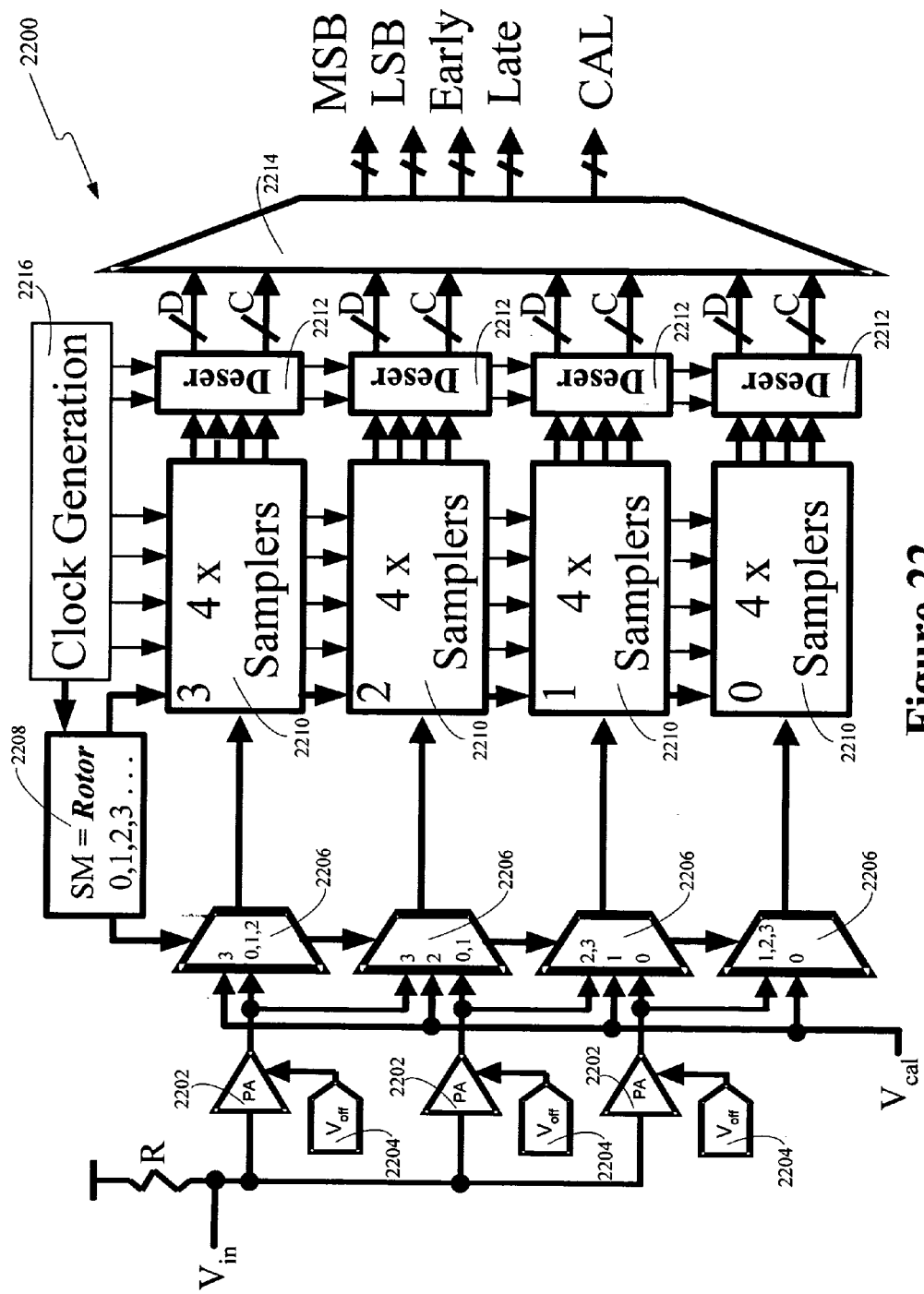
FIG. 22 shows an alternate embodiment of an improved differential LSB and MSB extractor circuit for use in a differential 4-PAM signaling system in accordance with the present invention.

Referring to FIG. 22, there is shown an alternate embodiment of an improved differential LSB and MSB extractor circuit 2200 for use in a differential 4-PAM signaling system in accordance with the present invention. The improved differential LSB and MSB extractor circuit 2200 comprises a plurality of preamplifiers 2202, a plurality of adjustable offset voltage sources 2204, a plurality of analog multiplexers 2206, a clocked state machine 2208, a plurality of clocked multiple-sampler circuits 2210, a plurality of clocked deserializers 2112, a parallel digital multiplexer and LSB combiner circuit 2214, and clock generation circuitry 2216 for generating clock signals for the clocked state machine 2208, the plurality of clocked multiple-sampler circuits 2210, and the plurality of clocked deserializers 2212. The improved differential LSB and MSB extractor circuit 2200 receives a differential 4-PAM input signal (i.e., $V_{in}$) and a differential 4-PAM calibration reference signal (i.e., $V_{cal}$), and generates parallel data blocks for the LSB and the MSB in the differential 4-PAM input signal (i.e., $V_{in}$), as well as parallel data blocks for clock data recovery (CDR) and calibration (CAL) purposes.

In operation, the clocked state machine 2208 functions similar to a rotor by selecting individual inputs in each of the plurality of analog multiplexers 2206 in a sequential order such that three of the plurality of clocked multiple-sampler circuits 2210 are being used, while one of the plurality of clocked multiple-sampler circuits 2210 is being internally calibrated. Thus, redundancy is provided in the plurality of clocked multiple-sampler circuits 2210 (as well as in the plurality of clocked deserializers 2212) so as to allow offset voltage calibration in the plurality of clocked multiple-sampler circuits 2210 and thereby eliminate uncorrelated random offset error voltages.

At this point it should be noted that the clock signals generated for the clocked state machine 2208 and the plurality of clocked multiple-sampler circuits 2210 may be divided by two to generate data (D) output signals in the plurality of clocked deserializers 2212, and divided by five to generate clock (C) output signals in the plurality of clocked deserializers 2212. Thus, the preamplified differential 4-PAM input signals from the plurality of preamplifiers 2202 and the differential 4-PAM calibration reference signal (i.e., $V_{cal}$) are switched through the plurality of analog multiplexers 2206 in a relatively low speed domain. It should also be noted that the plurality of adjustable offset voltage sources 2204 may be implemented using a precision digital-to-analog converter (DAC). It should further be noted that the improved differential LSB and MSB extractor circuit 2200 of FIG. 22 allows more flexibility than the improved differential LSB and MSB extractor circuit 2100 of FIG. 21 in that not all of the plurality of analog multiplexers 2206 in the improved differential LSB and MSB extractor circuit 2200 of FIG. 22 are required to switch simultaneously. Also, the plurality of analog multiplexers 2206 in the improved differential LSB and MSB extractor circuit 2200 of FIG. 22 may require only 3:1 or 2:1 multiplexing ratios, whereas all of the plurality of analog multiplexers 2106 in the improved differential LSB and MSB extractor circuit 2100 of FIG. 21 require 4:1 multiplexing ratios.

Figure 23A:
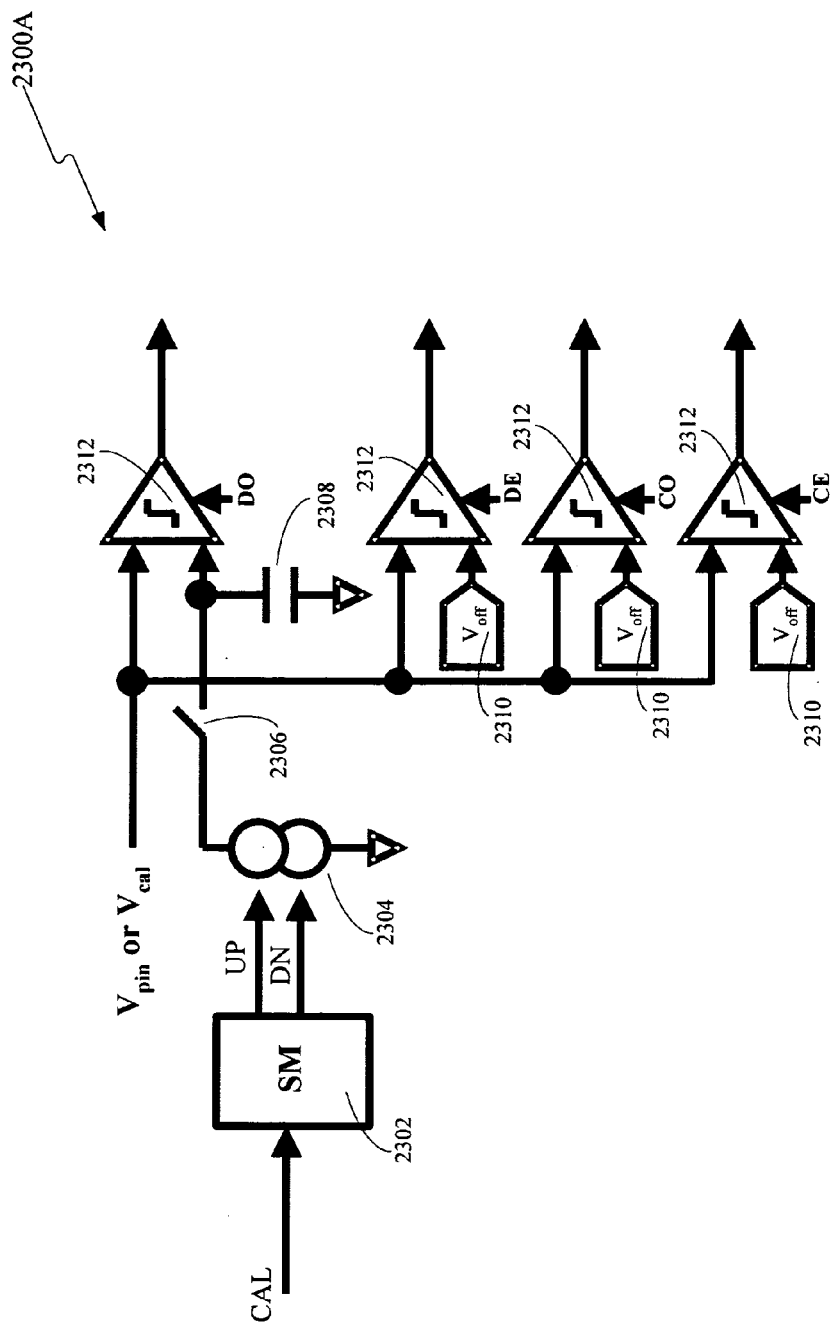
FIG. 23A shows a more detailed schematic diagram of one of the plurality of multiple clocked sampler circuits shown in FIGS. 21 and 22 in accordance with the present invention.

Referring to FIG. 23A, there is shown a more detailed schematic diagram of one of the plurality of clocked multiple-sampler circuits 2300A shown in FIGS. 21 and 22 in accordance with the present invention. The sampler circuit 2300A comprises a state machine 2302, an adjustable current source 2304, a switching device 2306, a charge storage device 2308, a plurality of adjustable offset voltage sources 2310, and a plurality of clocked sampler devices 2312.

In operation, the clocked state machines 2108 and 2208 of FIGS. 21 and 22, respectively, control the state of the switching device 2306 and the type of input signal (i.e., either the preamplified differential 4-PAM input signal (i.e., $V_{pin}$) or the differential 4-PAM calibration reference signal (i.e., $V_{cal}$)). That is, when the clocked multiple-sampler circuit 2300A is not being calibrated, the preamplified differential 4-PAM input signal (i.e., $V_{pin}$) is applied to the plurality of clocked sampler devices 2312 and the switching device 2306 is open. In this situation, the charge storage device 2308 and the plurality of adjustable offset voltage sources 2310 provide offset voltages to the plurality of clocked sampler devices 2312. However, when the clocked multiple-sampler circuit 2300A is being calibrated, the differential 4-PAM calibration reference signal (i.e., $V_{cal}$) is applied to the plurality of clocked sampler devices 2312 and the switching device 2306 is closed. In this situation, the state machine 2302 receives a calibration input signal (CAL), which directs the state machine 2302 to adjust the output level of the adjustable current source 2304, and thereby adjust the offset voltage stored the charge storage device 2308. This adjustment is regulated through the calibration input signal (CAL) based upon feedback from the sampling of the differential 4-PAM calibration reference signal (i.e., $V_{cal}$) by the plurality of clocked sampler devices 2312.

Of course, each of the plurality of clocked sampler devices 2312 also receives one of a data odd (DO) clock signal, a data even (DE) clock signal, a clock odd (CO) clock signal, or a clock even (CE) clock signal from the clocked state machines 2108 and 2208 of FIGS. 21 and 22, respectively. In response thereto, each of the plurality of clocked sampler devices 2330 generates a sampled output signal, which is deserialized by a respective one of the plurality of clocked deserializers 2112 and 2212 of FIGS. 21 and 22, respectively.

At this point it should be noted that all of the plurality of adjustable offset voltage sources 2310 may be adjusted in accordance with the calibration process just described. To that end, each of the plurality of adjustable offset voltage sources 2310 may comprise a charge storage device, and the state machine 2302 and the adjustable current source 2304 may be shared amongst or duplicated for each of the plurality of adjustable offset voltage sources 2310.

Figure 23B:
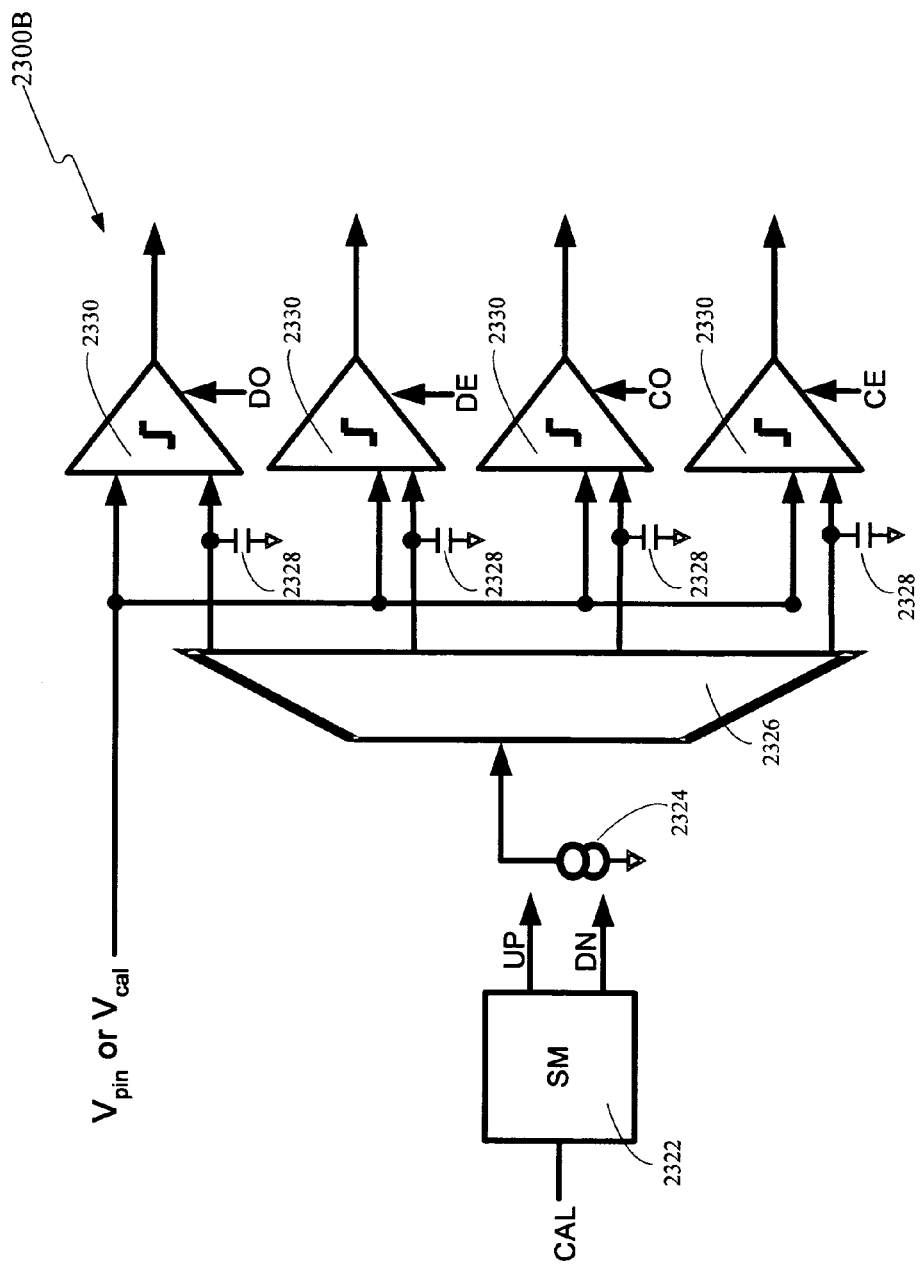
FIG. 23B shows an alternate more detailed schematic diagram of one of the plurality of multiple clocked sampler circuits shown in FIGS. 21 and 22 in accordance with the present invention.

Referring to FIG. 23B, there is shown an alternate more detailed schematic diagram of one of the plurality of clocked multiple-sampler circuits 2300B shown in FIGS. 21 and 22 in accordance with the present invention. The sampler circuit 2300B comprises a state machine 2322, an adjustable current source 2324, an analog multiplexing device 2326, a plurality of charge storage devices 2328, and a plurality of clocked sampler devices 2330.

In operation, the clocked state machines 2108 and 2208 of FIGS. 21 and 22, respectively, control the state of the analog multiplexing device 2326 and the type of input signal (i.e., either the preamplified differential 4-PAM input signal (i.e., $V_{pin}$) or the differential 4-PAM calibration reference signal (i.e., $V_{cal}$)). That is, when the clocked multiple-sampler circuit 2300B is not being calibrated, the preamplified differential 4-PAM input signal (i.e., $V_{pin}$) is applied to the plurality of clocked sampler devices 2330 and the analog multiplexing device 2326 is turned off. In this situation, the plurality of charge storage devices 2328 provide offset voltages to the plurality of clocked sampler devices 2330. However, when the clocked multiple-sampler circuit 2300B is being calibrated, the differential 4-PAM calibration reference signal (i.e., $V_{cal}$) is applied to the plurality of clocked sampler devices 2330 and the analog multiplexing device 2326 is turned on. In this situation, the state machine 2322 receives a calibration input signal (CAL), which directs the state machine 2322 to adjust the output level of the adjustable current source 2324, and thereby adjust the offset voltage stored the plurality of charge storage devices 2328. This adjustment is regulated through the calibration input signal (CAL) based upon feedback from the sampling of the differential 4-PAM calibration reference signal (i.e., $V_{cal}$) by the plurality of clocked sampler devices 2330.

Of course, each of the plurality of clocked sampler devices 2330 also receives one of a data odd (DO) clock signal, a data even (DE) clock signal, a clock odd (CO) clock signal, or a clock even (CE) clock signal from the clocked state machines 2108 and 2208 of FIGS. 21 and 22, respectively. In response thereto, each of the plurality of clocked sampler devices 2330 generates a sampled output signal, which is deserialized by a respective one of the plurality of clocked deserializers 2112 and 2212 of FIGS. 21 and 22, respectively.

Figure 24:
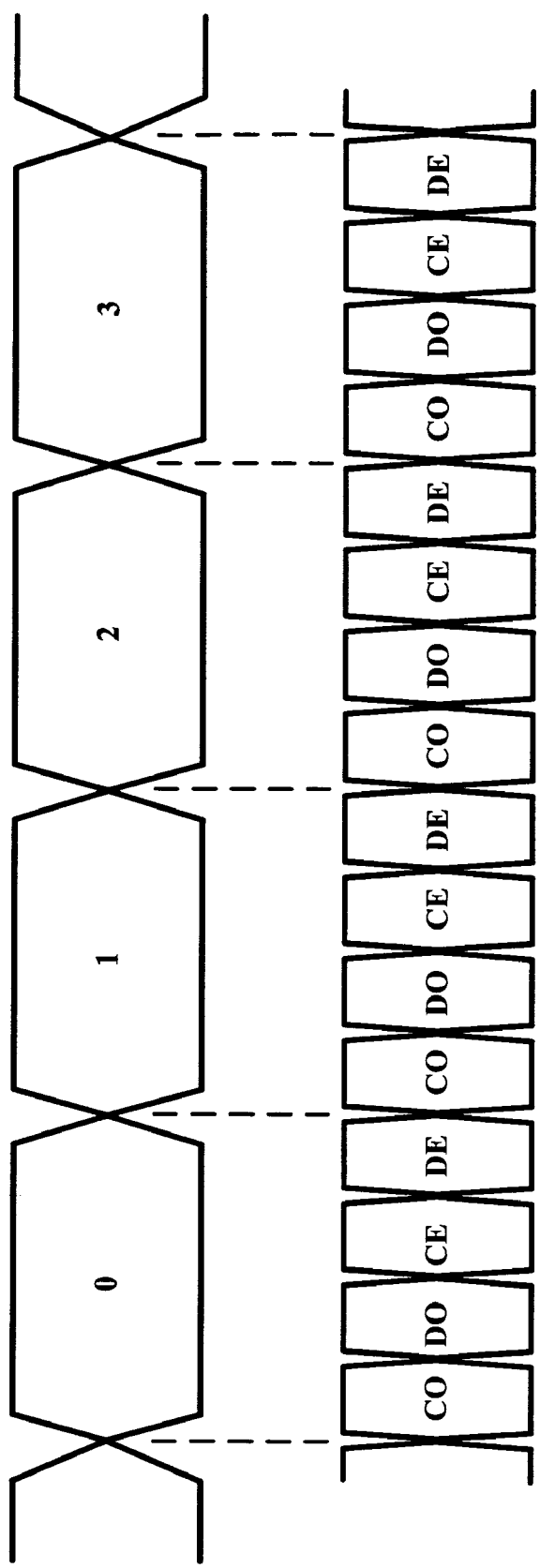
FIG. 24 shows a timing diagram for a full use and calibration cycle in the improved differential LSB and MSB extractor circuits of FIGS. 21 and 22 in accordance with the present invention.

Referring to FIG. 24, there is shown a timing diagram for a full use and calibration cycle in the improved differential LSB and MSB extractor circuits 2100 and 2200 of FIGS. 21 and 22 in accordance with the present invention. The upper waveform in FIG. 24 represents the rotation of the clocked state machines 2108 and 2208, and hence the plurality of analog multiplexers 2106 and 2206, the plurality of clocked deserializers 2112 and 2212, and the plurality of clocked multiple-sampler circuits 2110 and 2210, in the improved differential LSB and MSB extractor circuits 2100 and 2200 of FIGS. 21 and 22, respectively, through their use and calibration phases. The lower waveform in FIG. 24 represents each of the plurality of clocked sampler devices 2312 and 2330 in the sampler circuits 2300A and 2300B of FIGS. 23A and 23B, respectively, undergoing its calibration phase. Each of the plurality of clocked sampler devices 2312 and 2330 is undergoing a calibration phase for $1/16$ of the full cycle time. Thus, the offset voltages are required to be stored and accurate for $15/16$ of the full cycle time. Also, each of the plurality of clocked sampler devices 2312 and 2330 is in use for $12/16$ of the full cycle time.

At this point it should be noted that receiving differential multi-PAM signals in accordance with the present invention as described above typically involves the processing of input data and the generation of output data to some extent. This input data processing and output data generation may be implemented in hardware or software. For example, specific electronic components may be employed in a state machine or similar or related circuitry for implementing the functions associated with receiving differential multi-PAM signals in accordance with the present invention as described above. Alternatively, one or more processors operating in accordance with stored instructions may implement the functions associated with receiving differential multi-PAM signals in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A differential multiple pulse amplitude modulated (multi-PAM) extractor circuit comprising:
   an upper least significant bit (LSB) sampler circuit configured to receive a differential multi-PAM input signal and a first differential reference signal, and to generate a first differential sampled output signal;
   a lower LSB sampler circuit configured to receive the differential multi-PAM input signal and a second differential reference signal, and to generate a second differential sampled output signal; and
   a combiner circuit configured to receive the first differential sampled output signal and the second differential sampled output signal, and to generate a differential LSB output signal indicating an LSB value of the differential multi-PAM input signal.

2. The differential multi-PAM extractor circuit of claim 1, further comprising:
   a most significant bit (MSB) sampler circuit configured to receive the differential multi-PAM input signal and a reference signal, and to generate a differential MSB output signal indicating an MSB value of the differential multi-PAM input signal.

3. The differential multi-PAM extractor circuit of claim 1, wherein the first differential reference signal and the second differential reference signal are the same differential reference signal.

4. The differential multi-PAM extractor circuit of claim 1, wherein the first differential reference signal and the second differential reference signal are different differential reference signals.

5. The differential multi-PAM extractor circuit of claim 1, wherein the upper LSB sampler circuit and the lower LSB sampler circuit comprise:
   first and second pairs of input transistors configured to receive the differential multi-PAM input signal;
   first and second pairs of offset transistors, coupled to the first and second pairs of input transistors, respectively, and configured to receive the first and second differential reference signals, respectively;
   first and second linear loads coupled to the first and second pairs of input transistors and the first and second pairs of offset transistors, respectively; and
   a plurality of current sources coupled to the first and second pairs of input transistors and the first and second pairs of offset transistors;
   wherein first and second differential output signals are generated based upon the values of the differential multi-PAM input signal and the first and second differential reference signals, respectively.

6. The differential multi-PAM extractor circuit of claim 5, wherein the upper LSB sampler circuit and the lower LSB sampler circuit further comprise:
   first and second sampler devices, coupled to the first and second pairs of input transistors and the first and second pairs of offset transistors, respectively, and configured to sample the first and second differential output signals, respectively, and to generate the first and second differential sampled output signals, respectively.

7. The differential multi-PAM extractor circuit of claim 6, wherein the combiner circuit comprises:
   an exclusive OR logic device configured to receive the first and second differential sampled output signals and to generate the differential LSB output signal.

8. The differential multi-PAM extractor circuit of claim 6, wherein the first and second sampler devices are clocked at a sampling rate.

9. The differential multi-PAM extractor circuit of claim 5, wherein the first and second differential reference signals have similar voltage levels, but are opposite in polarity.

10. The differential multi-PAM extractor circuit of claim 5, wherein the first and second differential reference signals have a common-mode similar to the differential multi-PAM input signal.

11. The differential multi-PAM extractor circuit of claim 1, wherein the upper LSB sampler circuit and the lower LSB sampler circuit comprise:

first and second pairs of input transistors configured to receive the differential multi-PAM input signal;
first and second pairs of offset transistors, coupled to the first and second pairs of input transistors, respectively, and configured to receive the first and second differential reference signals, respectively;
first and second nonlinear loads coupled to the first and second pairs of input transistors and the first and second pairs of offset transistors, respectively; and
a plurality of switches coupled to the first and second pairs of input transistors and the first and second pairs of offset transistors;
wherein first and second differential output signals are generated based upon the values of the differential multi-PAM input signal and the first and second differential reference signals, respectively.

12. The differential multi-PAM extractor circuit of claim 11, wherein the plurality of switches are clocked at a sampling rate.

13. The differential multi-PAM extractor circuit of claim 12, wherein the first and second nonlinear loads are clocked at the sampling rate for sampling the first and second differential output signals, respectively, and for generating first and second differential sampled output signals, respectively.

14. The differential multi-PAM extractor circuit of claim 13, wherein the combiner circuit comprises:
an exclusive OR logic device configured to receive the first and second differential sampled output signals and to generate the differential LSB output signal.

15. The differential multi-PAM extractor circuit of claim 11, wherein the first and second differential reference signals have similar voltage levels, but are opposite in polarity.

16. The differential multi-PAM extractor circuit of claim 11, wherein the first and second differential reference signals have a common-mode similar to the differential multi-PAM input signal.

17. A differential multiple pulse amplitude modulated (multi-PAM) extractor circuit comprising:
a pair of input transistors configured to receive a differential multi-PAM input signal;
a pair of equalization transistors, coupled to the pair of input transistors, and configured to receive a differential equalization signal;
a linear load coupled to the pair of input transistors and the pair of equalization transistors; and
a pair of current sources coupled to the pair of input transistors and the pair of equalization transistors, respectively;
wherein the differential equalization signal has a common-mode similar to the differential multi-PAM input signal.

18. A differential multiple pulse amplitude modulated (multi-PAM) extractor circuit comprising:
a pair of input transistors configured to receive a differential multi-PAM input signal;
a pair of equalization transistors, coupled to the pair of input transistors, and configured to receive a differential equalization signal;
a nonlinear load coupled to the pair of input transistors and the pair of equalization transistors; and
a pair of switches coupled to the pair of input transistors and the pair of equalization transistors, respectively;
wherein the differential equalization signal has a common-mode similar to the differential multi-PAM input signal.

19. The differential multi-PAM extractor circuit of claim 18, wherein the pair of switches are clocked at a sampling rate.

20. The differential multi-PAM extractor circuit of claim 19, wherein the nonlinear load is clocked at the sampling rate for sampling a differential output signal, and for generating a sampled output signal.

21. A differential multiple pulse amplitude modulated (multi-PAM) extractor circuit comprising:
first and second pairs of input transistors configured to receive a differential multi-PAM input signal;
first and second pairs of adjustable resistive elements, coupled to the first and second pairs of input transistors, respectively, and configured to receive a differential control signal;
a load coupled to the first and second pairs of input transistors; and
a pair of current sources coupled to the first and second pairs of adjustable resistive elements, respectively;
wherein the differential control signal is applied to the first and second pairs of adjustable resistance elements so as to adjust their resistance value.

22. The differential multi-PAM extractor circuit of claim 21, wherein the first and second pairs of adjustable resistance elements comprise field effect transistors having gates that are controlled by the differential control signal.

23. A differential multiple pulse amplitude modulated (multi-PAM) extractor circuit comprising:
first and second pairs of adjustable voltage sources connected in series with signal paths for a differential multi-PAM input signal, the first and second pairs of adjustable voltage sources configured to receive a differential control signal;
first and second pairs of input transistors, coupled to the first and second pairs of adjustable voltage sources, respectively, and configured to receive voltage adjusted differential multi-PAM input signals from the first and second pairs of adjustable voltage sources, respectively;
a load coupled to the first and second pairs of input transistors; and
a pair of current sources coupled to the first and second pairs of input transistors, respectively.

24. The differential multi-PAM extractor circuit of claim 23, wherein the differential control signal is applied to the first and second pairs of adjustable voltage sources so as to adjust their voltage value.

25. The differential multi-PAM extractor circuit of claim 23, wherein the first and second pairs of adjustable voltage sources comprise resistor divider circuits.

26. The differential multi-PAM extractor circuit of claim 25, wherein the resistor divider circuits comprise an adjustable resistive element.

27. The differential multi-PAM extractor circuit of claim 25, wherein the resistor divider circuits comprise an adjustable voltage source.

28. A differential multiple pulse amplitude modulated (multi-PAM) extractor circuit comprising:
a differential amplifier circuit configured to receive a differential multi-PAM input signal and to generate an amplified differential multi-PAM signal;
a differential automatic gain control circuit, coupled to the differential amplifier circuit, and configured to control gain in the differential amplifier circuit;
a first differential sampler circuit, coupled to the differential amplifier circuit and the differential automatic gain control circuit, and configured to sample the amplified differential multi-PAM signal and to generate a first output signal indicating a most significant bit value of the differential multi-PAM input signal; and a second differential sampler circuit, coupled to the differential amplifier circuit and the differential automatic gain control circuit, and configured to sample the amplified differential multi-PAM signal and to generate a second output signal indicating a least significant bit value of the differential multi-PAM input signal.

29. The differential multi-PAM extractor circuit of claim 28, wherein the first and second differential sampler circuits are clocked at a sampling rate.

30. A differential multiple pulse amplitude modulated (multi-PAM) extractor circuit comprising:

a first differential amplifier circuit configured to receive a differential multi-PAM input signal and to generate a first amplified differential multi-PAM signal;

a second differential amplifier circuit configured to receive the differential multi-PAM input signal and to generate a second amplified differential multi-PAM signal;

a first differential automatic gain control circuit, coupled to the first differential amplifier circuit, and configured to control gain in the first differential amplifier circuit;

a second differential automatic gain control circuit, coupled to the second differential amplifier circuit, and configured to control gain in the second differential amplifier circuit;

a first differential sampler circuit, coupled to the first differential amplifier circuit and the first differential automatic gain control circuit, and configured to sample the first amplified differential multi-PAM signal and to generate a first output signal indicating a most significant bit value of the differential multi-PAM input signal; and a second differential sampler circuit, coupled to the second differential amplifier circuit and the second differential automatic gain control circuit, and configured to sample the second amplified differential multi-PAM signal and to generate a second output signal indicating a least significant bit value of the differential multi-PAM input signal.

31. The differential multi-PAM extractor circuit of claim 30, wherein the first and second differential sampler circuits are clocked at a sampling rate.

32. A differential multiple pulse amplitude modulated (multi-PAM) extractor circuit comprising:

a first differential amplifier circuit configured to receive a differential multi-PAM input signal and to generate a first amplified differential multi-PAM signal;

a second differential amplifier circuit configured to receive the differential multi-PAM input signal and to generate a second amplified differential multi-PAM signal;

a differential automatic gain control circuit, coupled to the first differential amplifier circuit and the second differential amplifier circuit, and configured to control gain in the first differential amplifier circuit and the second differential amplifier circuit based at least in part upon the first amplified differential multi-PAM signal;

a first differential sampler circuit, coupled to the first differential amplifier circuit and the differential automatic gain control circuit, and configured to sample the first amplified differential multi-PAM signal and to generate a first output signal indicating a most significant bit value of the differential multi-PAM input signal; and a second differential sampler circuit, coupled to the second differential amplifier circuit, and configured to sample the second amplified differential multi-PAM signal and to generate a second output signal indicating a least significant bit value of the differential multi-PAM input signal.

33. The differential multi-PAM extractor circuit of claim 32, wherein the first and second differential sampler circuits are clocked at a sampling rate.

34. A differential multiple pulse amplitude modulated (multi-PAM) extractor circuit comprising:

a plurality of differential amplifier circuits configured to receive a differential multi-PAM input signal and to generate a plurality of amplified differential multi-PAM signals;

a plurality of adjustable offset voltage sources, coupled to the plurality of differential amplifier circuits, respectively, and configured to provide a plurality of offset voltage signals to the plurality of differential amplifier circuits, respectively; and a plurality of differential multiple-sampler circuits, coupled to the plurality of differential amplifier circuits, respectively, and configured to multiple-sample the plurality of amplified differential multi-PAM signals, respectively, to generate a plurality of multiple-sampled multi-PAM signals, respectively, and to determine a most significant bit value and a least significant bit value of the differential multi-PAM input signal.

35. The differential multi-PAM extractor circuit of claim 34, further comprising:

a plurality of deserializer circuits, coupled to the plurality of differential multiple-sampler circuits, and configured to receive the plurality of multiple-sampled multi-PAM signals and to generate parallel data blocks for determining the most significant bit value and the least significant bit value of the differential multi-PAM input signal.

36. The differential multi-PAM extractor circuit of claim 35, wherein the plurality of deserializer circuits also generate parallel data blocks for clock data recovery purposes.

37. The differential multi-PAM extractor circuit of claim 35, wherein the plurality of deserializer circuits also generate parallel data blocks for calibration of the plurality of differential multiple-sampler circuits.

38. The differential multi-PAM extractor circuit of claim 35, further comprising:

a parallel digital multiplexer, coupled to the plurality of deserializer circuits, and configured to direct the parallel data blocks.

39. The differential multi-PAM extractor circuit of claim 35, wherein the plurality of deserializer circuits are clocked at a sampling rate.

40. The differential multi-PAM extractor circuit of claim 39, wherein the plurality of differential multiple-sampler circuits are clocked at a sampling rate.

41. The differential multi-PAM extractor circuit of claim 40, further comprising:

clock generation circuitry configured to generate clock signals for the plurality of differential multiple-sampler circuits and the plurality of deserializer circuits.

42. The differential multi-PAM extractor circuit of claim 34, further comprising:

a plurality of analog multiplexers, mostly coupled to the plurality of differential amplifier circuits, and configured to direct the plurality of amplified differential multi-PAM signals and a differential multi-PAM calibration reference signal to the plurality of differential multiple-sampler circuits.

43. The differential multi-PAM extractor circuit of claim 42, further comprising:
a state machine configured to control the states of the plurality of analog multiplexers.

44. The differential multi-PAM extractor circuit of claim 42, wherein each of the plurality of differential multiple-sampler circuits comprises:
an adjustable current source;
a plurality of charge storage devices, switchably coupled to the adjustable current source, and configured to store a plurality of charges, respectively, supplied by the adjustable current source; and
a plurality of clocked sampler devices, coupled to the plurality of analog multiplexers and the plurality of charge storage devices, respectively, and configured to periodically receive the differential multi-PAM calibration reference signal for calibrating a respective stored charge.

45. The differential multi-PAM extractor circuit of claim 44, wherein each of the plurality of differential multiple-sampler circuits further comprises:
a plurality of switching devices, coupled between the adjustable current source and the plurality of charge storage devices, respectively, and configured to periodically connect the adjustable current source to the plurality of charge storage devices.

46. The differential multi-PAM extractor circuit of claim 45, further comprising:
a state machine configured to control the states of the plurality of switching devices.

47. The differential multi-PAM extractor circuit of claim 44, wherein each of the plurality of differential multiple-sampler circuits further comprises:
an analog multiplexing device, coupled between the adjustable current source and the plurality of charge storage devices, and configured to periodically connect the adjustable current source to the plurality of charge storage devices.

48. The differential multi-PAM extractor circuit of claim 47, further comprising:
a state machine configured to control the state of the analog multiplexing device.

49. The differential multi-PAM extractor circuit of claim 44, wherein each of the plurality of differential multiple-sampler circuits further comprises:
a controller configured to control the adjustable current source.

50. The differential multi-PAM extractor circuit of claim 49, wherein the controller is a state machine.

51. The differential multi-PAM extractor circuit of claim 34, further comprising:
a state machine configured to control the states of the plurality of differential multiple-sampler circuits.

52. The differential multi-PAM extractor circuit of claim 37, wherein at least one of the plurality of adjustable offset voltage sources comprises a precision digital-to-analog converter.

* * * * *